United States Patent
Kawamoto et al.

(10) Patent No.: US 8,175,273 B2
(45) Date of Patent: May 8, 2012

(54) QUANTUM CRYPTOGRAPHY COMMUNICATION METHOD, QUANTUM CRYPTOGRAPHY COMMUNICATION APPARATUS, AND QUANTUM CRYPTOGRAPHY COMMUNICATION SYSTEM

(75) Inventors: Yohei Kawamoto, Tokyo (JP); Ryo Namiki, Kanagawa (JP); Takuya Hirano, Tokyo (JP)

(73) Assignee: Sony Corporation (JP)

( * ) Notice: Subject to any disclaimer, the term of this patent is extended or adjusted under 35 U.S.C. 154(b) by 1232 days.

(21) Appl. No.: 11/242,222

(22) Filed: Oct. 3, 2005

(65) Prior Publication Data
US 2006/0083376 A1 Apr. 20, 2006

(30) Foreign Application Priority Data
Oct. 7, 2004 (JP) ................. P2004-295203

(51) Int. Cl.
*H04L 9/00* (2006.01)
(52) U.S. Cl. ........................ 380/263; 713/150
(58) Field of Classification Search .............. 380/256, 380/277, 255, 278, 263, 279, 204, 259, 260; 713/150, 201, 200
See application file for complete search history.

(56) References Cited

U.S. PATENT DOCUMENTS

| | | | | |
|---|---|---|---|---|
| 4,027,974 A * | 6/1977 | Bumgardner | ................. | 356/320 |
| 4,058,836 A * | 11/1977 | Drewery et al. | ............. | 348/620 |
| 4,961,615 A * | 10/1990 | Owechko et al. | ............... | 359/11 |
| 5,113,524 A * | 5/1992 | Hirota et al. | .................... | 398/43 |
| 5,339,182 A * | 8/1994 | Kimble et al. | ................ | 398/158 |
| 5,675,648 A * | 10/1997 | Townsend | .................... | 380/278 |
| 5,757,912 A * | 5/1998 | Blow | ............................ | 380/256 |
| 5,850,441 A * | 12/1998 | Townsend et al. | ............. | 380/283 |
| 5,940,514 A * | 8/1999 | Heanue et al. | ................ | 713/193 |
| 5,953,421 A * | 9/1999 | Townsend | .................... | 380/283 |
| 6,028,695 A * | 2/2000 | Uemura et al. | ............... | 359/279 |
| 6,801,626 B1 * | 10/2004 | Nambu | ........................ | 380/256 |
| 6,873,456 B2 * | 3/2005 | Motoshima et al. | ..... | 359/337.11 |

(Continued)

FOREIGN PATENT DOCUMENTS
JP 08139701 A 5/1996
(Continued)

OTHER PUBLICATIONS

Timothy P. Spiller, Quantum Information processing: cryptography, computation, and Teleportation, Dec. 12, 1996, IEEE, pp. 1719-1746.*

(Continued)

*Primary Examiner* — Eleni Shiferaw
*Assistant Examiner* — Abu Sholeman
(74) *Attorney, Agent, or Firm* — Lerner, David, Littenberg, Krumholz & Mentlik, LLP

(57) ABSTRACT

In quantum cryptography communication, a sequence of signals in the form of quantum states randomly selected from a plurality of quantum states each having a different phase modulation angle is transmitted from a data transmitting apparatus. In a data receiving apparatus, if the sequence of samples is received, a plurality of bases corresponding to a plurality of different phase modulation angles are randomly selected, and a homodyne detection process is performed using the selected bases. Information indicating the bases used in the homodyne detection process is sent to the transmitting apparatus. In the data transmitting apparatus, depending on the bases used in the receiving apparatus, bit values are assigned to the plurality of different quantum states selected by the transmitting apparatus, and information indicating the assigned bit values is sent to the data receiving apparatus.

20 Claims, 21 Drawing Sheets

U.S. PATENT DOCUMENTS

| | | | |
|---|---|---|---|
| 6,895,092 B2* | 5/2005 | Tomita | 380/278 |
| 6,995,404 B2* | 2/2006 | Franson et al. | 257/98 |
| 7,019,875 B2* | 3/2006 | Pittman et al. | 359/107 |
| 7,227,955 B2* | 6/2007 | Trifonov et al. | 380/256 |
| 7,266,304 B2* | 9/2007 | Duraffourg et al. | 398/151 |
| 7,305,091 B1* | 12/2007 | Hirano | 380/255 |
| 7,349,636 B2* | 3/2008 | Zitelli | 398/185 |
| 7,359,513 B2* | 4/2008 | Gisin et al. | 380/256 |
| 7,616,318 B2* | 11/2009 | Kikuchi | 356/450 |
| 7,627,126 B1* | 12/2009 | Pikalo et al. | 380/279 |
| 2002/0097874 A1* | 7/2002 | Foden et al. | 380/256 |
| 2003/0086138 A1* | 5/2003 | Pittman et al. | 359/108 |
| 2003/0169880 A1* | 9/2003 | Nambu et al. | 380/256 |
| 2004/0109564 A1* | 6/2004 | Cerf et al. | 380/256 |
| 2004/0119061 A1* | 6/2004 | Wu et al. | 257/9 |
| 2004/0141222 A1* | 7/2004 | Miyazaki et al. | 359/237 |
| 2004/0258421 A1* | 12/2004 | Conti et al. | 398/183 |
| 2005/0002676 A1* | 1/2005 | Zitelli | 398/188 |
| 2005/0036624 A1* | 2/2005 | Kent et al. | 380/277 |
| 2005/0041746 A1* | 2/2005 | Rosen et al. | 375/242 |
| 2005/0083535 A1* | 4/2005 | Kamshilin et al. | 356/502 |
| 2005/0100102 A1* | 5/2005 | Gazdzinski et al. | 375/242 |
| 2005/0135627 A1* | 6/2005 | Zavriyev et al. | 380/278 |
| 2005/0152414 A1* | 7/2005 | Fujii | 372/29.023 |
| 2005/0157875 A1* | 7/2005 | Nishioka et al. | 380/46 |
| 2005/0220301 A1* | 10/2005 | Svozil | 380/41 |
| 2005/0281561 A1* | 12/2005 | Tomaru | 398/161 |
| 2006/0262930 A1* | 11/2006 | Dinu et al. | 380/256 |
| 2006/0263096 A1* | 11/2006 | Dinu et al. | 398/187 |
| 2007/0058810 A1* | 3/2007 | Tanaka et al. | 380/210 |
| 2007/0248229 A1* | 10/2007 | Kawamoto et al. | 380/256 |

FOREIGN PATENT DOCUMENTS

| | | |
|---|---|---|
| JP | 2000-101570 | 4/2000 |
| JP | 2000324100 A | 11/2000 |
| JP | 2003037593 A | 2/2003 |

OTHER PUBLICATIONS

Hirano et al., Physical Review, 68; 0423311-0423317 (2003).
Nakami et al., Physical Review, 67; 0223081-0223087 (2003).
Office Action from Japanese Application No. 2004-295203, dated Sep. 7, 2010.

* cited by examiner

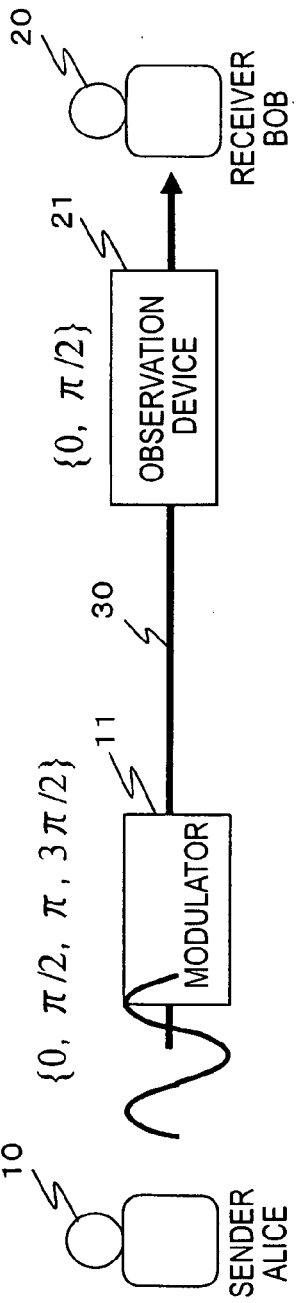

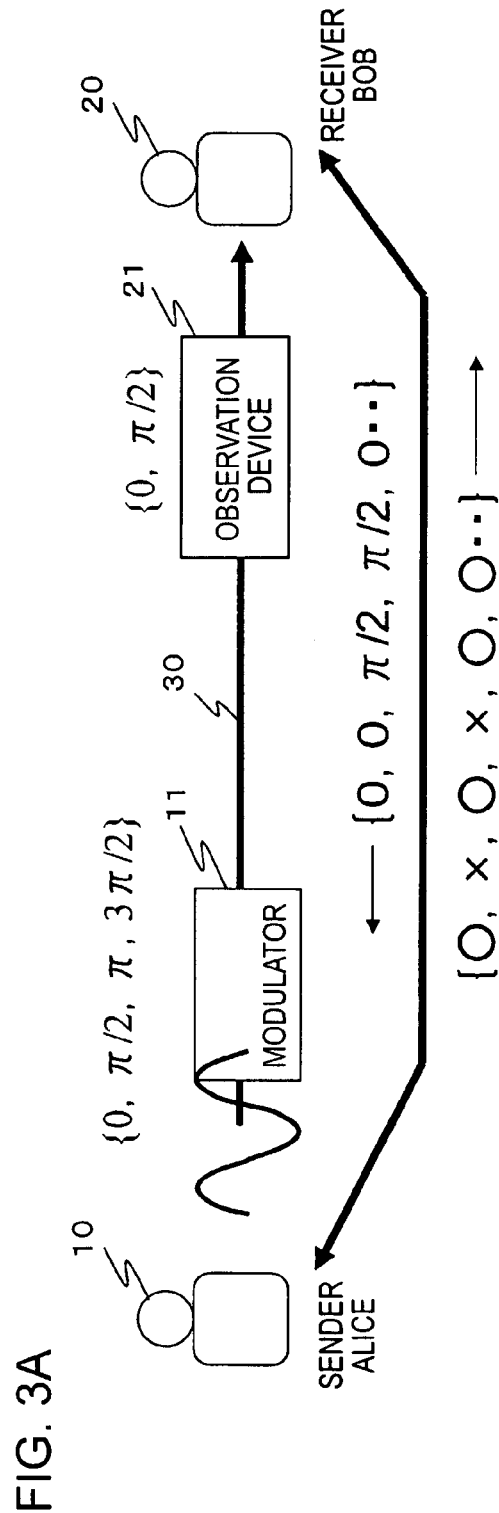

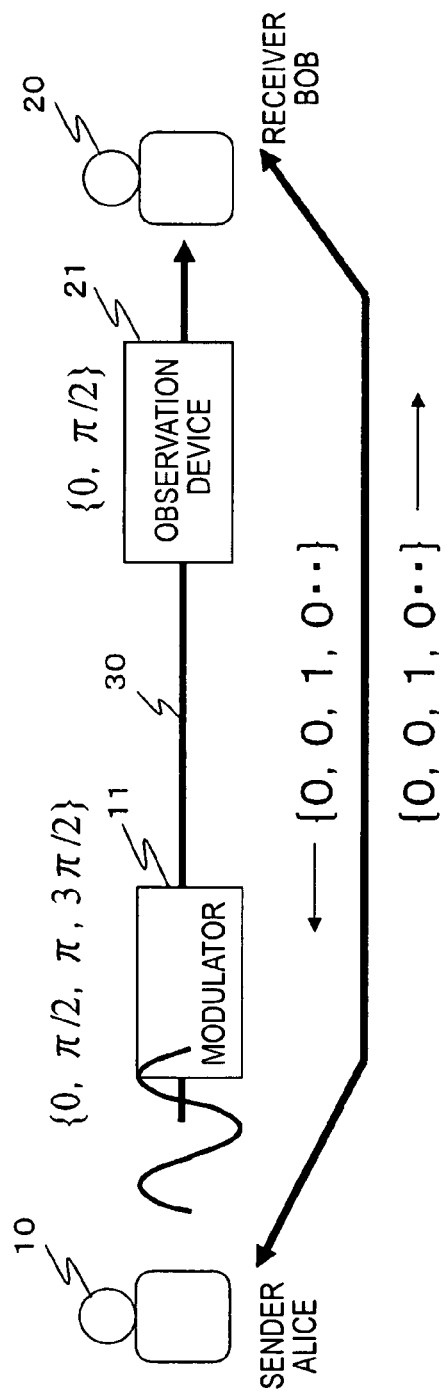

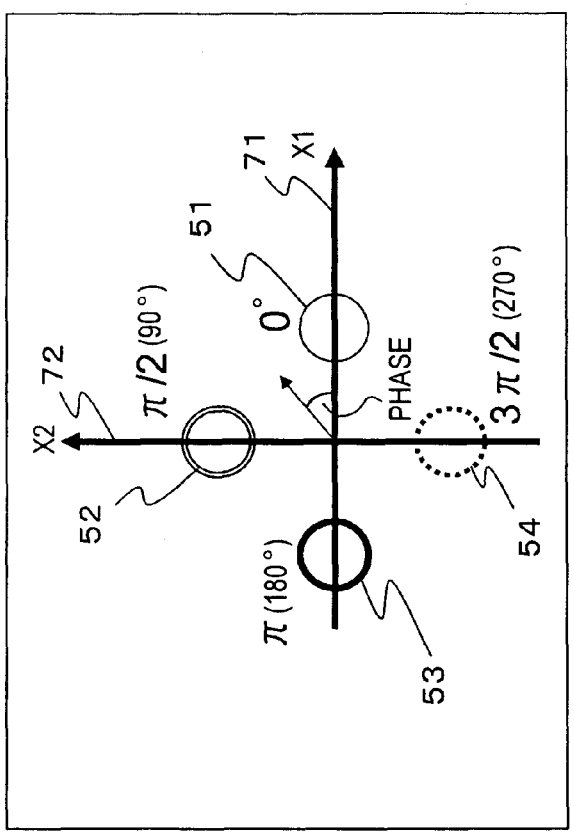

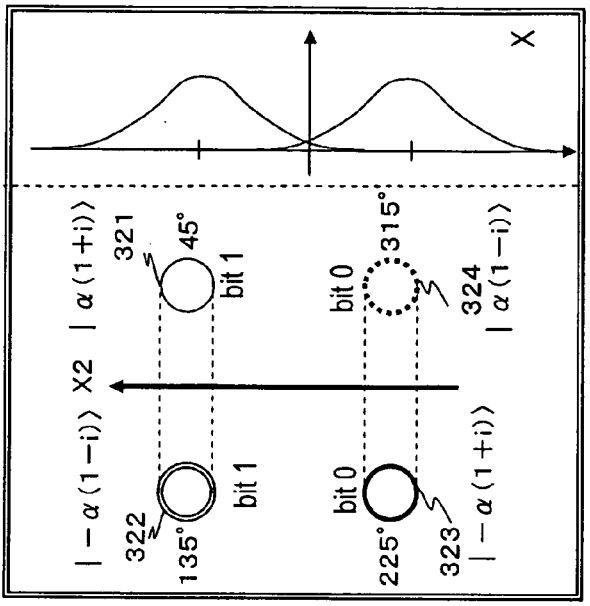
FIG. 11A
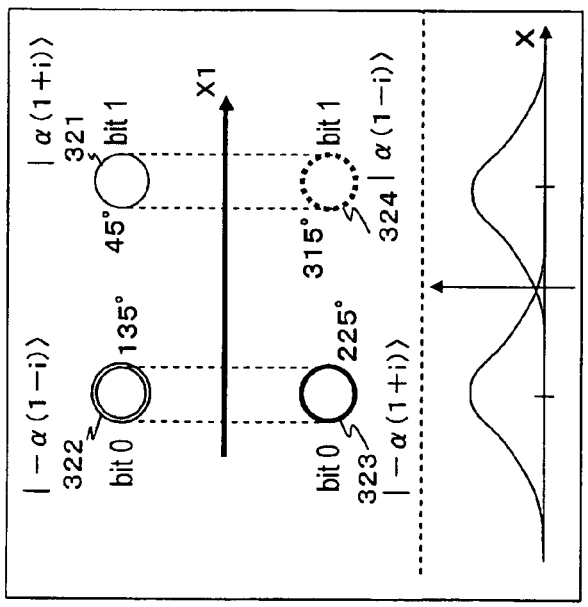
FIG. 11B
FIG. 11C
| | | ○ 45° | ◎ 135° | ● 225° | ○ 315° | |
|---|---|---|---|---|---|---|
| (A) | AMOUNT OF PHASE MODULATION (φA) AT DATA SENDER | X1  0 | X1  0 | X1  0 | X1  0 | |
| (B) | AMOUNT OF PHASE MODULATION (φB) AT DATA RECEIVER | X2 $\frac{\pi}{2}$ | X1  0 | X1  0 | X2 $\frac{\pi}{2}$ | |
| (C) | SHARED BITS | 1 | 0 | 0 | 1 | |
| (D) | SHARABLE INFORMATION RATIO | 100% | | | | |

FIG. 14

| | | | | | | | |
|---|---|---|---|---|---|---|---|
| (A) | AMOUNT OF PHASE MODULATION (φA) AT DATA SENDER | ○ 0° | | ◎ 120° | | ○ 240° | |
| (B) | AMOUNT OF PHASE MODULATION (φB) AT DATA RECEIVER | 90° | −30° | −150° | 90° | −30° | −150° | −30° | 90° | −30° | −150° |
| (C) | SHARED BITS | NOT MATCHED IN BASIS | 1 | 0 | 1 | 0 | NOT MATCHED IN BASIS | 0 | NOT MATCHED IN BASIS | 1 |
| (D) | SHARABLE INFORMATION RATIO | 2/3 (BASIS MISMATCHING RATIO: 1/3) | | | | | | |

FIG. 16A

| | | | | | | | | |
|---|---|---|---|---|---|---|---|---|
| (A) | AMOUNT OF PHASE MODULATION (φA) AT DATA SENDER | ○ 90° | | ○ 0° | | ○ 60° | | ◎ 120° |
| (B) | AMOUNT OF PHASE MODULATION (φB) AT DATA RECEIVER | 90° | −150° | −30° | −150° | −30° | −150° | −30° |
| (C) | SHARED BITS | NOT MATCHED IN BASIS | 0 | 1 | 0 | 1 | NOT MATCHED IN BASIS | 0 | 1 | 0 | NOT MATCHED IN BASIS |
| (D) | SHARABLE INFORMATION RATIO | 2/3 (BASIS MISMATCHING RATIO: 1/3) | | | | | | |

FIG. 16B

| | | | | | | | | |
|---|---|---|---|---|---|---|---|---|
| (A) | AMOUNT OF PHASE MODULATION (φA) AT DATA SENDER | ⊙ 90° | | ⊙ 180° | | ● 240° | | ⊙ 300° |
| (B) | AMOUNT OF PHASE MODULATION (φB) AT DATA RECEIVER | 90° | −150° | −30° | −150° | −30° | −150° | −30° |
| (C) | SHARED BITS | NOT MATCHED IN BASIS | 0 | 1 | 0 | 1 | NOT MATCHED IN BASIS | 0 | 1 | NOT MATCHED IN BASIS |
| (D) | SHARABLE INFORMATION RATIO | 2/3 (BASIS MISMATCHING RATIO: 1/3) | | | | | | |

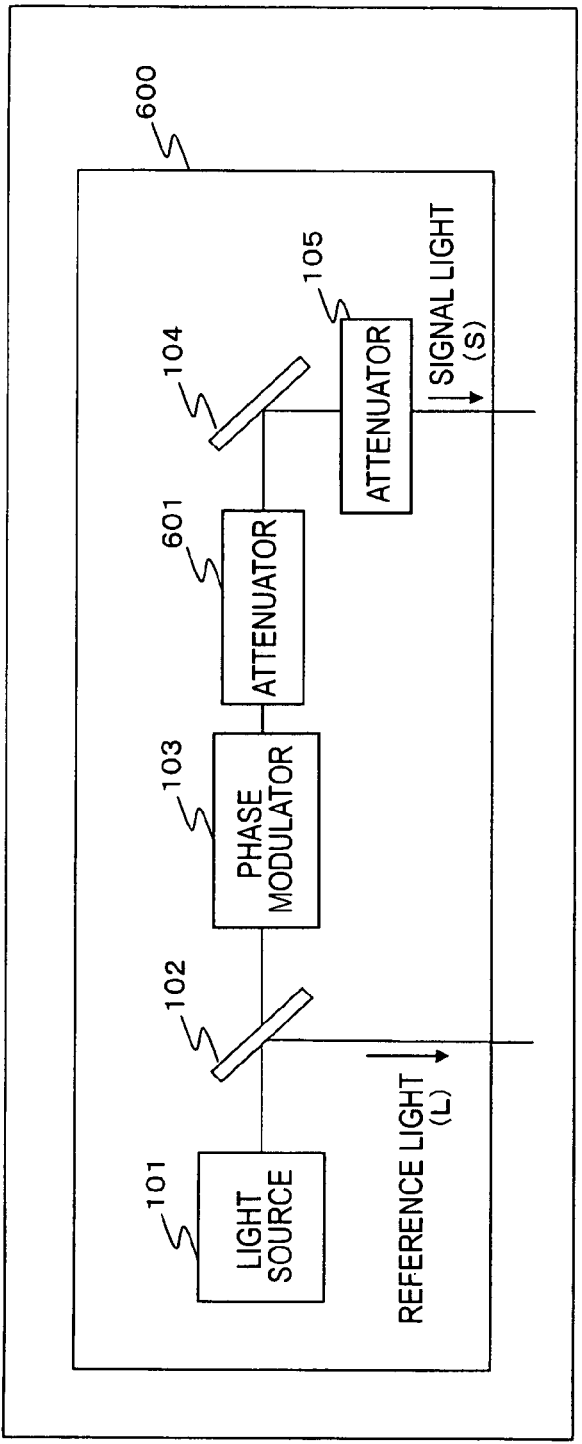
FIG. 18A
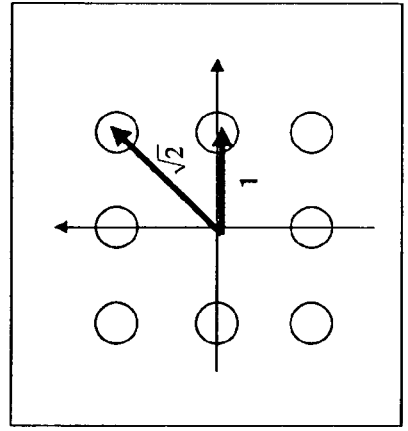
FIG. 18B
| AMOUNT OF PHASE MODULATION (φA) | AMOUNT OF MODULATION OF THE NUMBER OF PHOTONS (INTENSITY) |
|---|---|
| 0°, 90°, 180°, 270° | 1/2 |
| 45°, 135°, 225°, 315° | 1 |
FIG. 18C

FIG. 19A

| | | | | | | |
|---|---|---|---|---|---|---|
| (A) | AMOUNT OF PHASE MODULATION (φA) [AND AMOUNT OF INTENSITY MODULATION] AT DATA SENDER | 0° [1/2] | 0° [1/2] | 45° [1] | 90° [1/2] | 135° [1] |
| (B) | AMOUNT OF PHASE MODULATION (φB) AT DATA RECEIVER | 0° | 90° | 0° | 90° | 0° | 90° | 0° | 90° |
| (C) | SHARED BITS | 1 | NOT MATCHED IN BASIS | 1 | 1 | NOT MATCHED IN BASIS | 1 | 0 | 1 |
| (D) | SHARABLE INFORMATION RATIO | 3/4 [12/16 (BASIS MISMATCHING RATIO: 4/16)] | | | | | |

FIG. 19B

| | | | | | | |
|---|---|---|---|---|---|---|
| (A) | AMOUNT OF PHASE MODULATION (φA) [AND AMOUNT OF INTENSITY MODULATION] AT DATA SENDER | 180° [1/2] | 225° [1] | 270° [1/2] | 315° [1] |
| (B) | AMOUNT OF PHASE MODULATION (φB) AT DATA RECEIVER | 0° | 90° | 0° | 90° | 0° | 90° | 0° | 90° |
| (C) | SHARED BITS | 0 | NOT MATCHED IN BASIS | 0 | 0 | NOT MATCHED IN BASIS | 0 | 1 | 0 |
| (D) | SHARABLE INFORMATION RATIO | 3/4 [12/16 (BASIS MISMATCHING RATIO: 4/16)] | | | | | |

FIG. 21A

| | | 22.5° | | | | 67.5° | | | | 112.5° | | | | 157.5° | | | |
|---|---|---|---|---|---|---|---|---|---|---|---|---|---|---|---|---|---|
| (A) | AMOUNT OF PHASE MODULATION (φA) AT DATA SENDER | 0° | | | | 0° | | | | 0° | | | | 0° | | | |
| (B) | AMOUNT OF PHASE MODULATION (φB) AT DATA RECEIVER | | 45° | 90° | 135° | | 45° | 90° | 135° | | 45° | 90° | 135° | | 45° | 90° | 135° |
| (C) | SHARED BITS | 1 | 1 | 1 | 0 | 1 | 1 | 1 | 1 | 0 | 1 | 1 | 1 | 0 | 0 | 1 | 1 |
| (D) | SHARABLE INFORMATION RATIO | 100% [BASIS MISMATCHING RATIO: 0] | | | | | | | | | | | | | | | |

FIG. 21B

| | | 202.5° | | | | 247.5° | | | | 292.5° | | | | 337.5° | | | |
|---|---|---|---|---|---|---|---|---|---|---|---|---|---|---|---|---|---|
| (A) | AMOUNT OF PHASE MODULATION (φA) AT DATA SENDER | 0° | | | | 0° | | | | 0° | | | | 0° | | | |
| (B) | AMOUNT OF PHASE MODULATION (φB) AT DATA RECEIVER | | 45° | 90° | 135° | | 45° | 90° | 135° | | 45° | 90° | 135° | | 45° | 90° | 135° |
| (C) | SHARED BITS | 0 | 0 | 0 | 1 | 0 | 0 | 0 | 0 | 1 | 0 | 0 | 0 | 1 | 1 | 0 | 0 |
| (D) | SHARABLE INFORMATION RATIO | 100% [BASIS MISMATCHING RATIO: 0] | | | | | | | | | | | | | | | |

QUANTUM CRYPTOGRAPHY COMMUNICATION METHOD, QUANTUM CRYPTOGRAPHY COMMUNICATION APPARATUS, AND QUANTUM CRYPTOGRAPHY COMMUNICATION SYSTEM

CROSS-REFERENCE TO RELATED APPLICATIONS

The present application claims priority from Japanese Patent Application No. JP 2004-295203 filed on Oct. 7, 2004, the disclosure of which is hereby incorporated by reference herein.

BACKGROUND OF THE INVENTION

The present invention relates to a quantum cryptography communication method, a quantum cryptography communication apparatus, and a quantum cryptography communication system. More particularly, the present invention relates to a quantum cryptography communication method, a quantum cryptography communication apparatus, and a quantum cryptography communication system, allowing an information communication process and an information sharing process to be efficiently performed in a process of transmitting and sharing secret information using quantum cryptography.

In recent years, network communications and electronic commerce have become popular. As a result, it has become very important to achieve security in communication. To achieve security, various techniques of cryptography are used in communication.

The cryptography can be roughly classified into two groups; symmetric key cryptography, and public key cryptography. In the symmetric key cryptography, which is also called the symmetric cryptography, both a sender and a receiver have an identical secret key. A representative example of the symmetric key cryptography is DES (Data Encryption Standard) cryptography. The feature of the DES cryptography is that encryption and decryption can be performed by substantially the same algorithm.

In the public key cryptography or the asymmetric cryptography, unlike the symmetric key cryptography, a sender and a receiver use different keys. In the public key cryptography, unlike the symmetric key cryptography in which the same secret key is used in both encryption and decryption, a secret key that must be kept secret is possessed by a particular single person, and thus it is possible to easily manage the key. However, in the public key cryptography, a longer data processing time is needed than in the symmetric key cryptography, and the public key cryptography is used mainly in applications, such as transmission of a secret key or digital signature, in which a rather small amount of data is treated. A representative method of the public key cryptography is RSA (Rivest-Shamir-Adleman) cryptography. In the RSA cryptography, the product of two very large prime numbers (as large as, for example, 150-digit numbers) is used. That is, the RSA cryptography is based on the difficulty of factorization of the product of two large prime numbers into prime factors.

However, it is known that the difficulty in the factorization calculation will be overcome by a quantum computer based on the principles of the quantum mechanics. Besides it has not been proved in information theory that the difficulty in the factorization calculation is essential, and there is a possibility that an efficient algorithm of factorization using a conventional computer will be found. This means that the security of the public key cryptography is not perfect.

On the other hand, in the symmetric key cryptography in which a secret key is shared, it is required that the shared secret key should be kept secret from a third person. For example, when the secret key is transmitted via a network to share it, it is required to take sufficient measures to prevent the secret key from being eavesdropped when the secret key is transmitted via the network.

Use of quantum cryptography ensures that the secret key can be shared in a secure manner based on the physical laws. Communication of secret information using quantum cryptography is accomplished by transmitting weak signal light (for example, having a single photon) via an optical fiber or the like. The security of communication of secret information using quantum cryptography is based on the fact that when a quantum-encrypted signal received via a communication channel is detected, a correct state of weak light carrying the quantum-encrypted signal cannot be determined by a single measurement.

The outline of communication of secret information using quantum cryptography is described below. The sharing of the secret data is basically accomplished by transmitting polarized or phase-modulated light from a sending side to a receiving side, and detecting it on the receiving side.

An example of a communication process of secret information based on phase modulation is described below with reference to figures. As shown in FIG. 1A, a sender (Alice) 10 transmits a light signal to a receiver (Bob) 20 via a data communication channel 30 such as an optical fiber.

On the side of the sender (Alice) 10, coherent light is phase-modulated by an angle equal to one of $0$, $\pi/2$, $\pi$, and $3\pi/2$ by using a modulator 11, and resultant phase-modulated light is output. More specifically, for example, as shown in FIG. 1B, light is phase-modulated by a $0$ or $\pi/2$ for each bit 0, and by $\pi$ or $3\pi/2$ for each bit 1.

For example, when a bit sequence shown in the upper row (a) in a table shown in FIG. 1C is given as a selected bit sequence, a phase-modulated sequence signal shown in the lower row (b) in the table is output as phase-modulated light from the modulator 11 and is transmitted to the receiver (Bob) 20. Although in the present example, after a selected bit sequence is set, for example, as shown in the row (a), the modulation process is performed in accordance with the selected bit sequence, the modulation process may be performed in accordance with a random bit sequence without using a selected bit sequence. That is, without setting the selected bit sequence shown in the row (a), the phase modulation may be randomly performed as shown in the row (b), and the bit sequence corresponding to the phase-modulated bit sequence shown in the row (b) may be determined as the selected bit sequence shown in the row (a).

On the side of the receiver (Bob) 20, a process is performed as described below with reference to FIG. 2. That is, on the side of the receiver (Bob) 20, an observation device 21 randomly selects either $0$ or $\pi/2$ and performs phase modulation by the randomly selected angle. The observation device 21 then measures resultant interference. In the interference measurement, interference can be observed in the following two cases.

(1) When phase modulation is performed by $0$ or $\pi$ on the data sending side, and phase modulation of $0$ is performed by the observation device 21.

(2) When phase modulation is performed by $\pi/2$ or $\pi/2$ on the data sending side, and phase modulation of $\pi/2$ is performed by the observation device 21.

For any other combination, detection of bits based on interference is impossible. For example, if the observation device 21 on the side of the receiver (Bob) 20 performs phase modulation as shown in a row (c) of a table shown in FIG. 2B, bits are detected as shown in a row (d) of the table. In the row (d) indicating bit data detected based on interference, 0 or 1 is obtained as a detection result when the condition (1) or (2) described above is satisfied. In the row (d), symbols x denote bits that are undetectable because neither the condition (1) nor the condition (2) is satisfied.

As shown in FIG. 3, the receiver (Bob) 20 transmits information indicating the sequence of phase modulation modes applied in the observation device 21 on the side of the receiver (Bob) 20, that is, the receiver (Bob) 20 transmits the information sequence (0, 0, π/2, π/2, 0, ...) shown in the row (c) of the table shown in FIG. 3B to the sender (Alice) 10.

Based on the information indicating the sequence of phase modulation modes received from the receiver (Bob) 20, the sender (Alice) 10 generates information indicating positions at which modulation was correctly performed, that is, the condition (1) or (2) is satisfied and thus bits were detected, and positions at which modulation was incorrectly performed and thus the conditions (1) and (2) were not satisfied, and the sender (Alice) 10 transmits the generated information to the receiver (Bob) 20. In the present example, the information sequence (o, x, o, x, o, o) shown in the row (e) of the table shown in FIG. 3B is transmitted to the receiver (Bob) 20.

Note that the sequence of phase modification modes (0, 0, π/2, π/2, 0, ...) shown in the row (c) of the table shown in FIG. 3B and the information sequence (o, x, o, x, o, o) shown in the row (e) of the table shown in FIG. 3B may be transmitted respectively from the receiver (Bob) 20 and the sender (Alice) 10 via a public communication channel.

As shown in FIG. 4A, the receiver (Bob) 20 informs the sender (Alice) 10 of the bit information sequence (0, 0, 1, 0, ...) detected by the observation device 21. On the other hand, the sender (Alice) 10 informs the receiver (Bob) 20 of bit sequence information (0, 0, 1, 0, ...) including only bits at positions at which the condition (1) or (2) is satisfied. That is, in the row (a) of the table shown in FIG. 4B, bits are selected from those bits at positions corresponding to symbols o in the row (e) where phase modulation modes are matched between the sending side and the receiving side, and a sequence of the selected bits is transmitted. Also in this case, the transmission may be performed via a public communication channel.

When the communicating data transmitted via the data communication channel 30 is not eavesdropped, sequences of detected bits mutually transmitted for confirmation as shown in FIG. 4A are equal to each other. However, if the communicating data transmitted via the data communication channel 30 is eavesdropped, a difference occurs between sequences of detected bits mutually transmitted for confirmation, as shown in FIG. 5. This means that eavesdropping of data transmitted via the data communication channel 30 results in a change in the modulation state. That is, no difference occurs between sequences of detected bits mutually transmitted for confirmation when the data transmitted via the data communication channel 30 is not eavesdropped.

Via the data communication performed in the above-described manner, secret information such as a secret key used in the symmetric key cryptography can be shared. For example, to share a secret key with n bits, a confirmation is first made as to the equality between mutually transmitted bit sequences as described above with reference to FIG. 4. After the confirmation is made, n bits are selected from m bits (m>n) shared via the above-described process.

In the above-described data communication using the quantum cryptography, the authorized receiver needs to detect weak light pulses transmitted from the sender. As for methods to detect weak light pulses, a single photon detection method and a homodyne detection method are known. In the homodyne detection method, the state of weak signal light (S) (whose average number of photons is about one) is measured by superimposing a relative strong reference light (L) (whose average number of photons is typically about $10^6$) on the signal light (S).

Advantages of the homodyne detection method are the capability of operating at room temperature, the capability of measuring week light close to a lower theoretically limit using a currently available technique, and the capability of obtained detailed information about the states such as the probability distribution function of the orthogonal phase amplitude. Some signal detection methods used in the quantum cryptography are described, for example, in "Quantum Cryptography Using Pulsed Homodyne Detection" (T. Hirano, H. Yamanaka, M. Ashikaga, T. Konishi, and R. Namiki, Phys. Rev. A68,042331-1-7, 2003), "Security of Quantum Cryptography Using Balanced Homodyne Detection" (R. Namiki and T. Hirano, Physical Review, A67, 022308, 2003), and Japanese Unexamined Patent Application Publication No. 2000-101570.

In the quantum cryptography using the homodyne detection, encoding using four states is performed based on the analogy to the single photon detection method. Therefore, in this method, one half of signals do not contribute to transmission of a secret key because of mismatching of the basis. That is, one half of transmitted signal pulses cannot make a contribution to carry information, and thus the coding efficiency cannot be greater than ½.

With reference to FIG. 6, a description will be given below as to the coding efficiency in quantum cryptography using the homodyne detection method. FIG. 6A shows four quantum states (coherent states) 51 to 54 of modulation signals generated in the phase modulation process performed on the sending side, and also shows two bases X1 (71) and X2 (72) used as the observation system in the phase modulation process performed on the receiving side.

When the basis (phase modulation mode applied on the receiving side) X1 71 is used as the observation system on the receiving side, of the four quantum states (coherent states) 51 to 54 obtained as a result of the phase modulation performed on the sending side, only the 0° phase modulation signal in the quantum state 51 and the 180° (π) phase modulation signal in the quantum state 53 can be detected, but the 90° (π/2) phase modulation signal in the quantum state 52 and the 270° (π/2) phase modulation signal in the quantum state 54 cannot be detected. When the basis (phase modulation mode applied on the receiving side) X2 72 is used as the observation system on the receiving side, of the four quantum states 51 to 54 obtained as a result of the phase modulation performed on the sending side, only the 90° (π/2) phase modulation signal in the quantum state 52 and the 270° (π/2) phase modulation signal in the quantum state 54 can be detected, but the 0° phase modulation signal in the quantum state 51 and the 180° (π) phase modulation signal in the quantum state 53 cannot be detected.

FIG. 6B is a table showing correspondence in terms of the states. In this table shown in FIG. 6B, angles of phase modulation (ΦA) performed on the data sending side are shown in a row (A), angles of phase modulation (ΦB) performed on the data receiving side are shown in a row (B), detected bits and information as to matching/mismatching in the basis are shown in a row (C), and the detectable bit ratio (basis matching ratio) is shown in a row (D).

As shown in the row (A) of the table, as a result of the phase modulation performed on the sending side, a phase modulation signal in one of the four quantum statues 51 to 54 corresponding respectively to the four phase modulation angles (ΦA) is generated. That is, one of the four phase modulation signals described below is generated.

0° phase modulation signal in the quantum state 51
90° (π/2) phase modulation signal in the quantum state 52
180° (π) phase modulation signal in the quantum state 53
270° (π/2) phase modulation signal in the quantum state 54

The row (B) shows the angles of phase modulation (ΦB) performed on the data receiving side, which correspond to two bases (phase modulation modes applied on the receiving side) employed as the observation system (shown in FIG. 6A) on the receiving side, that is, the basis (phase modulation mode applied on the receiving side) X1 71, and the basis (phase modulation mode applied on the receiving side) X2 72.

When the four phase modulation signals are arbitrarily and randomly selected on the sending side, and the two observation systems are randomly selected on the receiving side, eight combinations shown in FIG. 6B equally occur.

The row (C) in FIG. 6B shows detected bits and data as to the matching/mismatching in the basis. As described earlier, when the basis (phase modulation mode applied on the receiving side) X1 71 is used as the observation system on the receiving side, only the 0° phase modulation signal in the quantum state 51 and the 180° (π) phase modulation signal in the quantum state 53 can be detected, while when the basis (phase modulation mode applied on the receiving side) X2 72 is used as the observation system on the receiving side, only the 90° (π/2) phase modulation signal in the quantum state 52 and the 270° (π/2) phase modulation signal in the quantum state 54 can be detected.

The observation system used on the receiving side is referred to as the basis of phase modulation on the receiving side. When the basis allows the bit to be detected on the receiving side, the basis is said to be matched. On the other hand, when the basis does not allow the bit to be detected on the receiving side, the basis is said to be mismatched. As can be seen from FIG. 6B, of the total of eight combinations, the basis is matched in four combinations, but the basis is not matched in the other four combinations. Thus, as shown in the row (D) of the table shown in FIG. 6B, the probability that the basis is matched on the data receiving side and thus a bit can be detected is equal to ½ (50%).

The matching and mismatching of the basis are described in further detail below with reference to FIGS. 7A to 7D. FIG. 7A shows combinations of the angle of phase modulation performed on the sending side and the angle of phase modulation performed on the receiving side, in which the basis is matched.

That is, the basis is matched for the following four combinations: when the angle of phase modulation (ΦB) performed on the data receiving side is equal to π/2, and the angle of phase modulation (ΦA) performed on the data sending side is equal to π/2 or π/2, or when the angle of phase modulation (ΦB) performed on the data receiving side is equal to 0, and the angle of phase modulation (ΦA) performed on the data sending side is equal to 0 or π.

In any of these four combinations, the signal can be distinguishably detected on the receiving side, as shown in FIG. 7B. That is, when Φ=|ΦA−ΦB| is given as data from which to distinguishably detect the signal, the bit value can be identified by determining whether the phase of the detection signal is Φ=0 or Φ=π.

The process of detecting the signal when the basis is matched has been described above.

FIG. 7C shows combinations of the angle of phase modulation performed on the sending side and the angle of phase modulation performed on the receiving side, in which the basis is not matched.

That is, the basis is not matched in the following four combinations: when the angle of phase modulation performed on the receiving side is ΦB=0, and the angle of phase modulation performed on the sending side is ΦA=π/2 or π/2; and when the angle of phase modulation performed on the receiving side is ΦB=π/2, and the angle of phase modulation performed on the sending side is ΦA=0 or π.

In any of these combinations, as shown in FIG. 7D, the signal cannot be distinguishably detected on the receiving side. That is, when Φ=|ΦA−ΦB| is given as data, only a signal with Φ=±(π/2) is detected, and the bit value cannot be identified, because of mismatching of the basis.

When the basis is not matched, the signal cannot carry a bit value of the secret information to be shared by the data sending side and the data receiving side, and thus the signal is discarded. In other words, only when the basis is matched, the signal can carry a bit value of the secret information to be shared by the data sending side and the data receiving side. Of the signals that are phase-modulated on the sending side and transmitted to the receiving side, up to ½ of the signals can be effective, but the remaining signals are useless.

As described above, in the known method and apparatus for transmitting secret information using quantum cryptography, only up to ½ of signals that are phase-modulated on the sending side and transmitted to the receiving side are effective, and the remaining signals are useless. That is, the transmission efficiency is very low.

SUMMARY OF THE INVENTION

In view of the above, the present invention provides a quantum cryptography communication method, a quantum cryptography communication apparatus, and a quantum cryptography communication system, capable of transmitting phase modulation signals carrying secret information using quantum cryptography from a sending side to a receiving side in a very efficient manner.

A method of performing quantum cryptography communication by performing a communication process based on quantum cryptography according to an embodiment of the present invention includes transmitting data from a data transmitting apparatus, the data including a sequence of signals in the form of quantum states randomly selected from a plurality of quantum states each having a different phase modulation angle; detecting the sequence of signals in a data receiving apparatus, the detection step including receiving the sequence of signals, randomly selecting a plurality of bases corresponding to a plurality of different phase modulation angles, and performing a homodyne detection process using the selected bases; notifying the data transmitting apparatus of applied phase modulation mode information indicating the bases used in the detection step; and sharing information in the data transmitting apparatus, the information sharing step including assigning bit values to the plurality of different quantum states selected by the data transmitting apparatus in accordance with the applied phase modulation mode information notified by the data receiving apparatus, and notifying the data receiving apparatus of the assigned bit values.

In this method of quantum cryptography communication, the data transmission step may include setting an infinite number of quantum states (coherent states), the quantum state setting step including selecting an integer M equal to or greater than 2, and randomly selecting a phase modulation angle from integral multiples of $2\pi/M$, whereby a phase modulation process is performed according to the selected phase modulation angle and the resultant phase-modulated signal is transmitted.

In the method of quantum cryptography communication, the information sharing step may include assigning bit values to an infinite number of different quantum states selected by the data transmitting apparatus in accordance with the applied phase modulation mode information notified by the data receiving apparatus such that no bit value is assigned to a quantum state determined to be difficult to measure using the selected bases (in a phase modulation process) in the data receiving apparatus.

In the method of quantum cryptography communication, the data transmission step may further include performing a number-of-photons adjustment process (intensity modulation) if the plurality of different quantum states include a quantum state in which the average number of photons is different from that in another quantum state.

In the method of quantum cryptography communication, the detection step may include discriminating a signal by comparing information detected in the homodyne detection process with a threshold value.

In the method of quantum cryptography communication, the data transmission step may include transmitting a signal sequence generated by randomly selecting quantum states each phase-modulated by a value equal to one of 45°, 135°, 225°, and 315°; the detection step may include receiving the signal sequence, randomly selecting a plurality of bases each corresponding to 0° or 90° as the plurality of different phase modulation angles, and performing the homodyne detection process using the selected bases; and the information sharing step may include assigning bit values to all of eight combinations of one of two applied phase modulation modes notified by the data receiving apparatus and one of four phase modulation angles 45°, 135°, 225°, and 315° set by the data transmitting apparatus, and notifying the data transmitting apparatus of the assigned bit values.

In the method of quantum cryptography communication, the data transmission step may include transmitting a signal sequence generated by randomly selecting quantum states each phase-modulated by a value equal to one of 0°, 120°, and 240°; the detection step may include receiving the signal sequence, randomly selecting a plurality of bases each corresponding to 90°, −30°, or −150° as the plurality of different phase modulation angles, and performing the homodyne detection process using the selected bases; and the information sharing step may include assigning bit values to six combinations of a total of nine combinations of one of three applied phase modulation modes notified by the data receiving apparatus and one of three phase modulation angles 0°, 120°, and 240° set by the data transmitting apparatus, and notifying the data transmitting apparatus of the assigned bit values.

In the method of quantum cryptography communication, the data transmission step may include transmitting a signal sequence generated by randomly selecting quantum states each phase-modulated by a value equal to one of 0°, 60°, 120°, 180°, 240°, and 300°; the detection step may include receiving the signal sequence, randomly selecting a plurality of bases each corresponding to 90°, −30°, or −150° as the plurality of different phase modulation angles, and performing the homodyne detection process using the selected bases; and the information sharing step may include assigning bit values to twelve combinations of a total of eighteen combinations of one of three applied phase modulation modes notified by the data receiving apparatus and one of six phase modulation angles 0°, 60°, 120°, 180°, 240°, and 300° set by the data transmitting apparatus, and notifying the data transmitting apparatus of the assigned bit values.

In the method of quantum cryptography communication, the data transmission step may include transmitting a signal sequence generated by randomly selecting quantum states each phase-modulated by a value equal to one of 0°, 45°, 90°, 135°, 180°, 225°, 270°, and 315°; the detection step may include receiving the signal sequence, randomly selecting a plurality of bases each corresponding to 0° or 90° as the plurality of different phase modulation angles, and performing the homodyne detection process using the selected bases; and the information sharing step may include assigning bit values to twelve combinations of a total of sixteen combinations of one of two applied phase modulation modes notified by the data receiving apparatus and one of eight phase modulation angles 0°, 45°, 90°, 135°, 180°, 225°, 270°, and 315° set by the data transmitting apparatus, and notifying the data transmitting apparatus of the assigned bit values.

In the method of quantum cryptography communication, the data transmission step may further include performing a number-of-photons adjustment process (intensity modulation) in the setting of eight quantum states respectively phase-modulated by 0°, 45°, 90°, 135°, 180°, 225°, 225°, and 315°.

In the method of quantum cryptography communication, the data transmission step may include transmitting a signal sequence generated by randomly selecting quantum states each phase-modulated by a value equal to one of 22.5°, 67.5°, 112.5°, 157.5°, 202.5°, 247.5°, 292.5°, and 337.5°; the detection step may include receiving the signal sequence, randomly selecting a plurality of bases each corresponding to 0°, 45°, 90°, or 135° as the plurality of different phase modulation angles, and performing the homodyne detection process using the selected bases; and the information sharing step may include assigning bit values to all thirty-two combinations of one of four applied phase modulation modes notified by the data receiving apparatus and one of eight phase modulation angles 22.5°, 67.5°, 112.5°, 157.5°, 202.5°, 247.5°, 292.5°, 337.5° set by the data transmitting apparatus, and notifying the data transmitting apparatus of the assigned bit values.

A quantum cryptography communication apparatus adapted to perform a data transmission process based on quantum cryptography according to an embodiment of the present invention includes a light source; a phase modulator; a beam splitter adapted to split light output from the light source to generate a reference light beam and an input light beam incident on the phase modulator; the phase modulator adapted to perform phase modulation on one of the light beams generated by the beam splitter to thereby generate phase-modulated light; and an attenuator adapted to attenuate the phase-modulated light to thereby generate signal light, wherein the phase modulator performs the phase modulation by a phase modulation angle equal to a value randomly selected from integral multiples of $2\pi/M$, where M is an integer equal to or greater than 2.

In this quantum cryptography communication apparatus, the phase modulator may perform the phase modulation by a phase modulation angle equal to a value randomly selected from 45°, 135°, 225°, and 315°.

In the quantum cryptography communication apparatus, the phase modulator may perform the phase modulation by a phase modulation angle equal to a value randomly selected from 0°, 120°, and 240°.

In the quantum cryptography communication apparatus, the phase modulator may perform the phase modulation by a phase modulation angle equal to a value randomly selected from 0°, 60°, 120°, 180°, 240°, and 300°.

In the quantum cryptography communication apparatus, the phase modulator may perform the phase modulation by a phase modulation angle equal to a value randomly selected from 0°, 45°, 90°, 135°, 180°, 225°, 270°, and 315°.

In the quantum cryptography communication apparatus, the phase modulator may perform the phase modulation by a phase modulation angle equal to a value randomly selected from 22.5°, 67.5°, 112.5°, 157.5°, 202.5°, 247.5°, 292.5°, and 337.5°.

A quantum cryptography communication apparatus adapted to receive quantum-encrypted data and perform a detection process according to an embodiment of the present invention includes a homodyne detection unit adapted to perform a homodyne detection process on the quantum-encrypted data, the homodyne detection unit including a phase modulator adapted to perform phase modulation on a received signal using a basis of phase modulation randomly selected from a set of a plurality of different bases, whereby the homodyne detection unit distinguishes at least two quantum states from each other in the homodyne detection process based on the phase modulation using the selected basis.

In this quantum cryptography communication apparatus, the phase modulator may perform the phase modulation using a basis of phase modulation randomly selected from a set of different bases corresponding respectively to 0° and 90°.

In the quantum cryptography communication apparatus, the phase modulator may perform the phase modulation using a basis of phase modulation randomly selected from a set of different bases corresponding respectively to 90°, −30°, and −150°.

In the quantum cryptography communication apparatus, the phase modulator may perform the phase modulation using a basis of phase modulation randomly selected from a set of different bases corresponding respectively to 0°, 45°, 90°, and 135°.

A quantum cryptography communication system adapted to perform a communication process based on quantum cryptography according to an embodiment of the present invention includes a data transmitting apparatus adapted to perform a data transmission process based on quantum cryptography; and a data receiving apparatus adapted to perform a receiving process on quantum-encrypted data; the data transmitting apparatus including a light source, a phase modulator, a beam splitter adapted to split light output from the light source to generate a reference light beam and an input light beam incident on the phase modulator, the phase modulator adapted to perform phase modulation on one of the light beams generated by the beam splitter to thereby generate phase-modulated light, and an attenuator adapted to attenuate the phase-modulated light to thereby generate signal light, wherein the phase modulator performs the phase modulation by a phase modulation angle equal to a value randomly selected from integral multiples of $2\pi/M$, where M is an integer equal to or greater than 2; and the data receiving apparatus including a homodyne detection unit adapted to perform a homodyne detection process on the quantum-encrypted data, the homodyne detection unit including a phase modulator adapted to perform phase modulation on a received signal using a basis of phase modulation randomly selected from a set of a plurality of different bases, whereby the homodyne detection unit distinguishes at least two quantum states from each other in the homodyne detection process based on the phase modulation using the selected basis.

A method of generating quantum-encrypted data by performing a data generation process based on quantum cryptography according to an embodiment of the present invention includes performing phase modulation by splitting light output from a light source into two light beams, one of which functions as a reference light beam and the other of which is to be input to a phase modulator, and performing phase modulation on one of the two light beams to thereby generate phase-modulated light; and attenuating the phase-modulated light, wherein the phase modulation step includes performing the phase modulation by a phase modulation angle equal to a value randomly selected from integral multiples of $2\pi/M$, where M is an integer equal to or greater than 2.

In this method of generating quantum-encrypted data, the phase modulation step may include performing the phase modulation by a phase modulation angle equal to a value randomly selected from 45°, 135°, 225°, and 315°.

In the method of generating quantum-encrypted data, the phase modulation step may include performing the phase modulation by a phase modulation angle equal to a value randomly selected from 0°, 120°, and 240°.

In the method of generating quantum-encrypted data, the phase modulation step may include performing the phase modulation by a phase modulation angle equal to a value randomly selected from 0°, 60°, 120°, 180°, 240°, and 300°.

In the method of generating quantum-encrypted data, the phase modulation step may include performing the phase modulation by a phase modulation angle equal to a value randomly selected from 0°, 45°, 90°, 135°, 180°, 225°, 270°, and 315°.

In the method of generating quantum-encrypted data, the phase modulation step may include performing the phase modulation by a phase modulation angle equal to a value randomly selected from 22.5°, 67.5°, 112.5°, 157.5°, 202.5°, 247.5°, 292.5°, and 337.5°.

A method of detecting quantum-encrypted data by receiving quantum-encrypted data and performing a detection process according to an embodiment of the present invention includes performing a homodyne detection process on the quantum-encrypted data, the homodyne detection process including performing phase modulation on a received signal using a basis of phase modulation randomly selected from a set of a plurality of different bases, whereby at least two quantum states are distinguished from each other based on the phase modulation using the selected basis.

In this method of detecting quantum-encrypted data, the phase modulation step may include performing the phase modulation using a basis of phase modulation randomly selected from a set of different bases corresponding respectively to 0° and 90°.

In the method of detecting quantum-encrypted data, the phase modulation step may include performing the phase modulation using a basis of phase modulation randomly selected from a set of different bases corresponding respectively to 90°, −30°, and −150°.

In the method of detecting quantum-encrypted data, the phase modulation step may include performing the phase modulation using a basis of phase modulation randomly selected from a set of different bases corresponding respectively to 0°, 45°, 90°, and 135°.

As can be seen from the above discussion, the present invention provides great advantages as described below. That is, in the quantum cryptography communication, the data transmitting apparatus transmits data including a sequence of signals in the form of quantum states randomly selected from a plurality of quantum states each having a different phase modulation angle. When the data receiving apparatus receives the sequence of signals, the data receiving apparatus randomly selects a plurality of bases corresponding to a plurality of different phase modulation angles, and performs a homodyne detection process using the selected bases. The data receiving apparatus notifies the data transmitting apparatus of applied phase modulation mode information indicating the bases used in the data receiving apparatus. In the data transmitting apparatus, bit values are assigned to the plurality of different quantum states selected by the data transmitting apparatus in accordance with the applied phase modulation mode information notified by the data receiving apparatus, and the data transmitting apparatus notifies the data receiving apparatus of the assigned bit values. More specifically, depending on the mode in which the measurement is performed in the data receiving apparatus, bit values are assigned to respective quantum states corresponding to integral multiples of $2\pi/M$ transmitted from the data transmitting apparatus, and the assigned bit values are shared by the data transmitting apparatus and the data receiving apparatus. If bit values of a secret key are assigned, then the secret key can be shared by the data transmitting apparatus and the data receiving apparatus. For example, when four phase modulation states are used on the sending side, and two phase modulation bases are used on the receiving side, bit information can be assigned to all four phase modulation states, and thus all these four phase modulation states can carry effective bit information, that is, all these four phase modulation states can contribute to sharing of bit information by the sending side and the receiving side. The effective assignment of bit information to a large number of quantum states results in an increase in data transmission efficiency. Furthermore, the large number of states and thus the corresponding large number of phase modulation modes make it difficult to eavesdrop on the information. The reduction in the possibility of being eavesdropped results in an increase in security.

BRIEF DESCRIPTION OF THE DRAWINGS

FIGS. 1A to 1C show an information communication process using quantum cryptography;

FIGS. 3A and 3B show an information communication process using quantum cryptography;

FIGS. 4A and 4B show an information communication process using quantum cryptography;

FIGS. 6A and 6B show data that can be transmitted as effective information to share by a quantum cryptography communication technique;

FIGS. 11A to 11C show a coding efficiency in a quantum cryptography communication process in a mode with 4N phase modulation states on a sending side and two phase modulation bases on a receiving side;

FIG. 14 shows a coding efficiency in a quantum cryptography communication process in a mode with three phase modulation states on a sending side and three phase modulation bases on a receiving side;

FIGS. 16A and 16B show a coding efficiency in a quantum cryptography communication process in a mode with six phase modulation states on a sending side and three phase modulation bases on a receiving side;

FIGS. 18A to 18C show a data transmitting apparatus for quantum cryptography communication and a process of adjusting the number of photons (an intensity modulation process) performed by the data transmitting apparatus, according to an embodiment of the present invention;

FIGS. 19A and 19B show a coding efficiency in a quantum cryptography communication process in a mode with eight phase modulation states on a sending side and two phase modulation bases on a receiving side;

FIGS. 21A and 21B show a coding efficiency in a quantum cryptography communication process in a mode with eight phase modulation states on a sending side and four phase modulation bases on a receiving side.

DETAILED DESCRIPTION

A quantum cryptography communication method, a quantum cryptography communication apparatus, and a quantum cryptography communication system according to the present invention are described in further detail below with reference to particular embodiments.

Figures 2A, 2B:
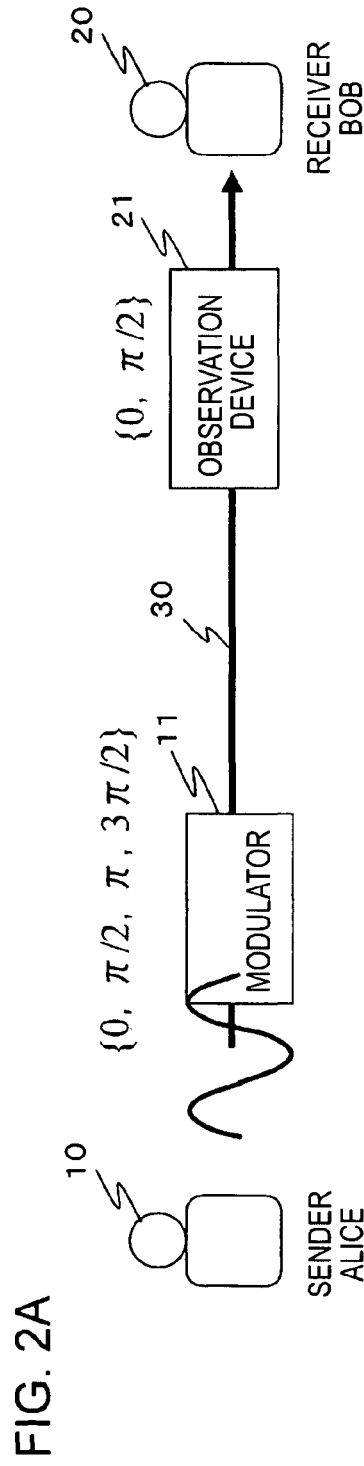
FIGS. 2A and 2B show an information communication process using quantum cryptography.
Figure 5:
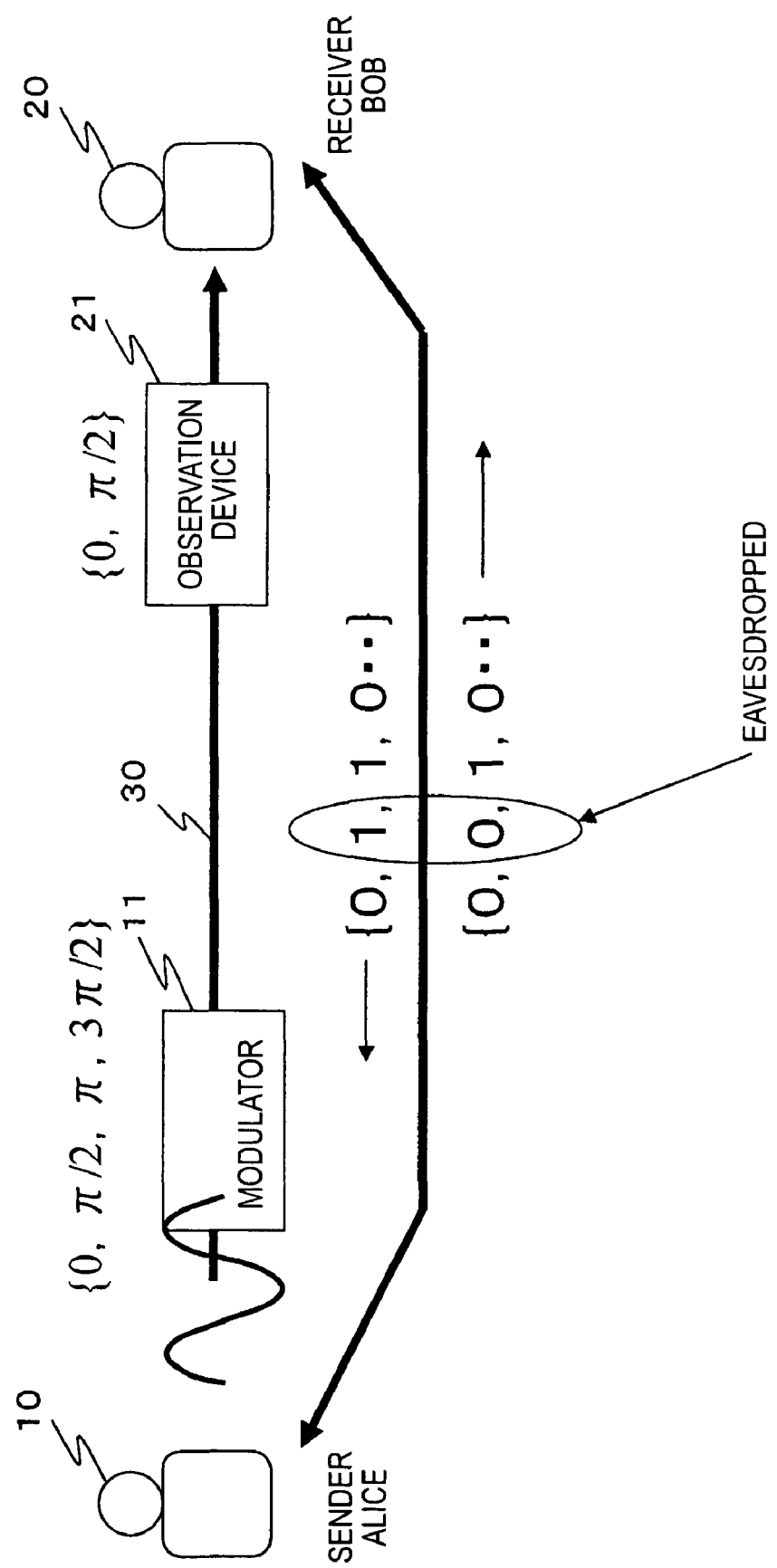
FIG. 5 shows an information communication process using quantum cryptography.
Figure 7A:
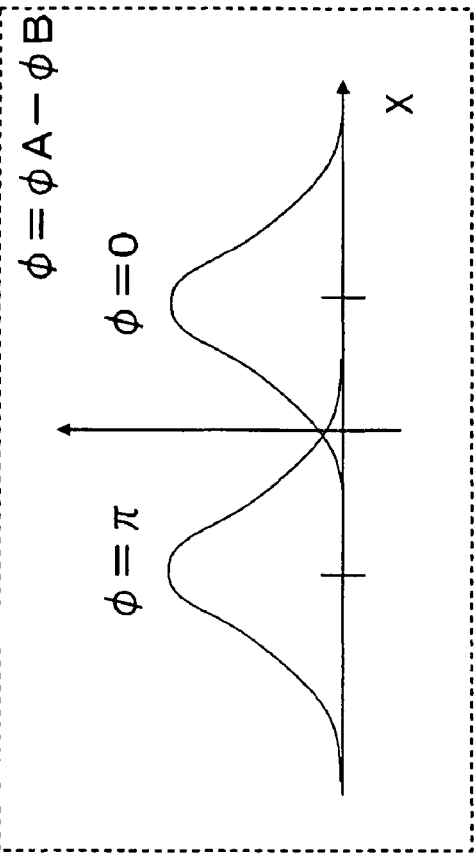
FIGS. 7A to 7D show data that can be transmitted as effective information to share by a quantum cryptography communication technique, and also show matching and mismatching of bases.
Figure 7C:
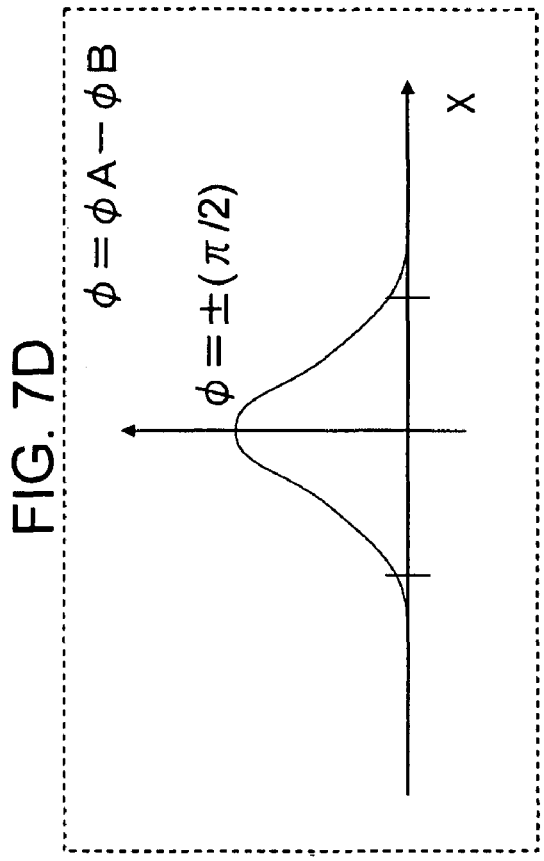
Figure 7B:
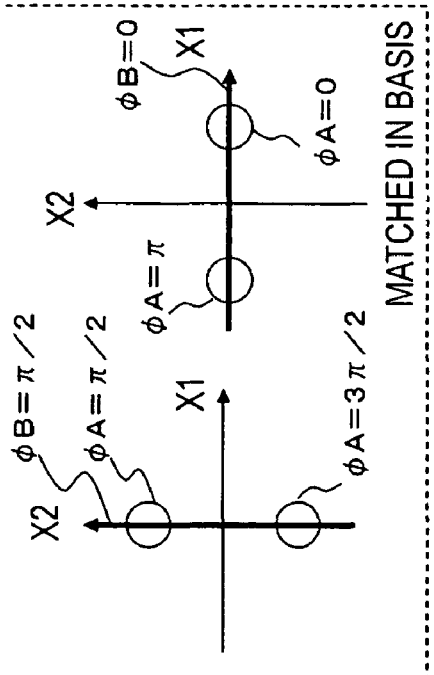
Figure 7D:
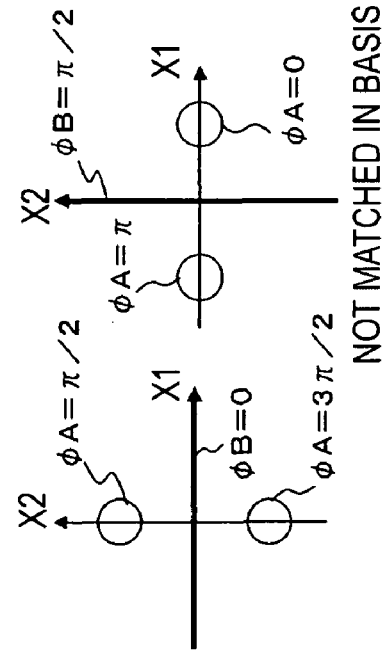
Figure 8:
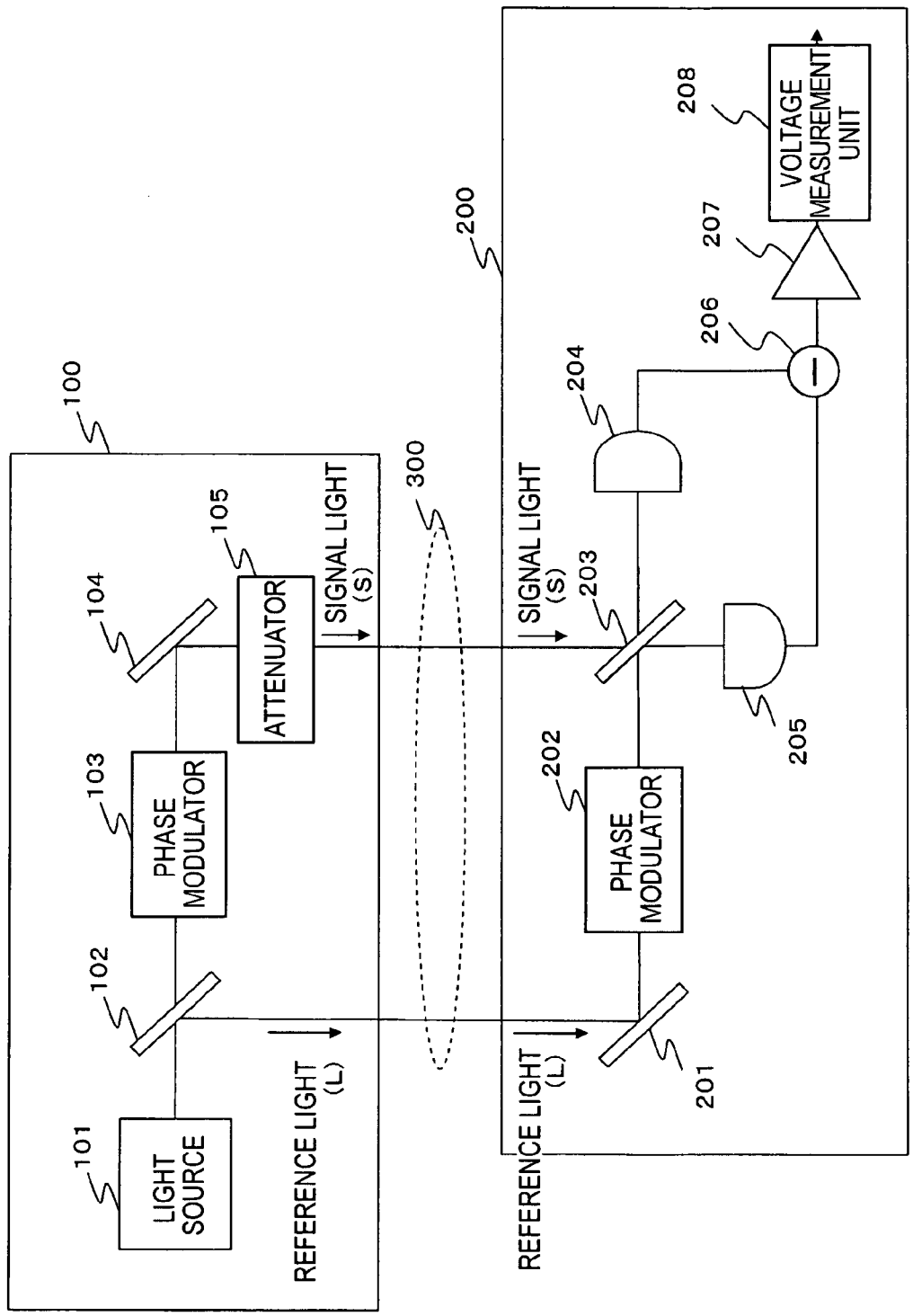
FIG. 8 shows a quantum cryptography communication system according to an embodiment of the present invention.

FIG. 8 shows a quantum cryptography communication system according to an embodiment of the present invention. Secret information is transmitted between a quantum cryptography communication apparatus 100 serving as a data transmitting apparatus and a quantum cryptography communication apparatus 200 serving as a data receiving apparatus via a communication channel 300 such as an optical fiber. An example of secret information transmitted is a common secret key used in symmetric key cryptography. Note that as for the communication channel 300, an optical fiber or free space may be employed. When free space is used as the communication channel, if the diameter of a light beam transmitted via the communication channel is increased using a telescope, an influence of diffraction of light can be reduced.

The quantum cryptography communication apparatus 100 serving as the data transmitting apparatus includes a light source 101, a beam splitter 102, a phase modulator 103, a mirror 104, and an attenuator 105. A semiconductor laser may be used as the light source 101. When an optical fiber with a long length is used as the communication channel 300, a semiconductor laser with a wavelength of 1.55 µm may be used to reduce an influence of an optical loss. A light pulse is emitted from the light source by modulating a current injected into the semiconductor laser or by using an electroabsorption modulator (EAM). It is desirable to use a DFB laser as the semiconductor laser to achieve a narrow spectrum width of light emitted from the light source, although a Fabry-Perot semiconductor laser may also be used.

Light emitted by the light source 101 is split by the beam splitter 102 into two beams, one of which is referred to as reference light (L) and the other as signal light (S). The signal light (S) is phase-modulated by the phase modulator 103 by a particular angle (for example, an angle randomly selected from 45°, 135°, 225°, and 315°). The phase-modulated signal light (S) is reflected by the mirror 104 and then attenuated in intensity by the attenuator 105 down to a level at which the signal light includes a single photon. The resultant signal light is output. On the other hand, the reference light (L) typically includes as many photons as about $10^7$).

In the present embodiment of the invention, the phase modulation is performed by the phase modulator 103 in a manner different from that employed in the known technique, as will be described in detail later.

The quantum cryptography communication apparatus 200 serving as the data receiving apparatus includes a mirror 201, a phase modulator 202, a beam splitter 203, photodiodes 204 and 205, a subtracter 206, an amplifier 207, and a voltage measurement unit 208. The quantum cryptography communication apparatus 200 serving as the data receiving apparatus performs a balanced homodyne detection based on the signal light (S) and the reference light (L) by using the beam splitter 203, the photodiodes 204 and 205, the subtracter 206, the amplifier 207, and the voltage measurement unit 208.

In the homodyne detection, the state of the signal light is measured by superimposing the reference light (L) with a relatively large intensity (whose typical averaged number of photons is about $10^6$) on the weak signal light (S) (whose averaged number of photons is about 1). If the quantum cryptography communication apparatus 200 receives the signal light (S) and the reference light (L), the reference light (L) is input to the phase modulator 202 via the mirror 201 and is modulated in phase by a particular angle (randomly selected to be equal to, for example, 0° or 90°) thereby generating a relative phase difference between the signal light (S) and the reference light (L). Thereafter, the signal light (S) and the reference light (L) are combined together by the beam splitter 203. Two light beams output from the beam splitter 203 are input to the respective photodiodes 204 and 205 and converted into electrical signals.

As for the photodiodes 204 and 205, Si photodiodes may be used when the light has a wavelength in a visible range or a near-infrared range, and Ge or InGaAs photodiodes may be used in the rage of 1.3 µm to 1.6 µm. The electrical signals output from the two photodiodes 204 and 205 are input to the subtracter 206, which generates a difference signal. The generated difference signal is amplified by the amplifier 207 and the voltage of the amplified signal is measured by the voltage measurement unit 208. As for the amplifier 207, a charge sensitive amplifier with a typical gain of 30 V/pC (pico coulomb) may be used. In this case, when the difference signal includes 10,000 electrons, 50 mV is obtained as the output voltage. The measured value is then normalized and phase amplitude information of the signal light (S) is obtained from the normalized value. Based on the phase amplitude information, the bit values are determined, and thus the transmitted secret information, such as bits of the secret key, is obtained.

Quantum cryptography communication may be practiced in various modes depending on the number of quantum states realized by phase modulation. Examples of quantum cryptography communication processes in a four-state mode, a six-state mode, and an eight-state mode are described below.
Quantum Cryptography Communication Process with Four Phase Modulation States on Sending Side and Two Phase Modulation Bases on Receiving Side In the quantum cryptography communication system described earlier with reference to FIG. 8, phase modulation by the phase modulator 103 of the quantum cryptography communication apparatus 100 serving as the data transmitting apparatus and corresponding phase modulation by the phase modulator 202 of the quantum cryptography communication apparatus 200 serving as the data receiving apparatus are performed as described below with reference to FIG. 9A.

Figure 9B:
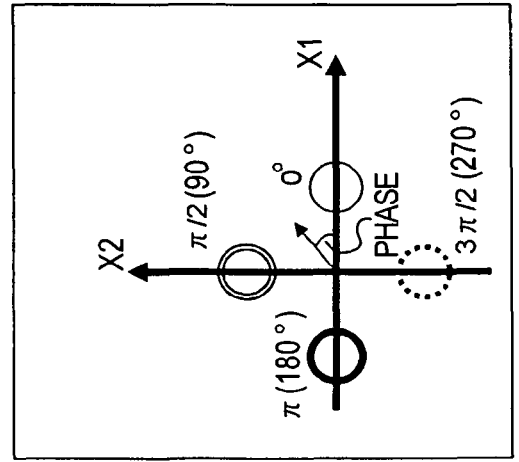
FIG. 9B shows, for the purpose of comparison, a phase modulation process according to a known technique.
Figure 9A:
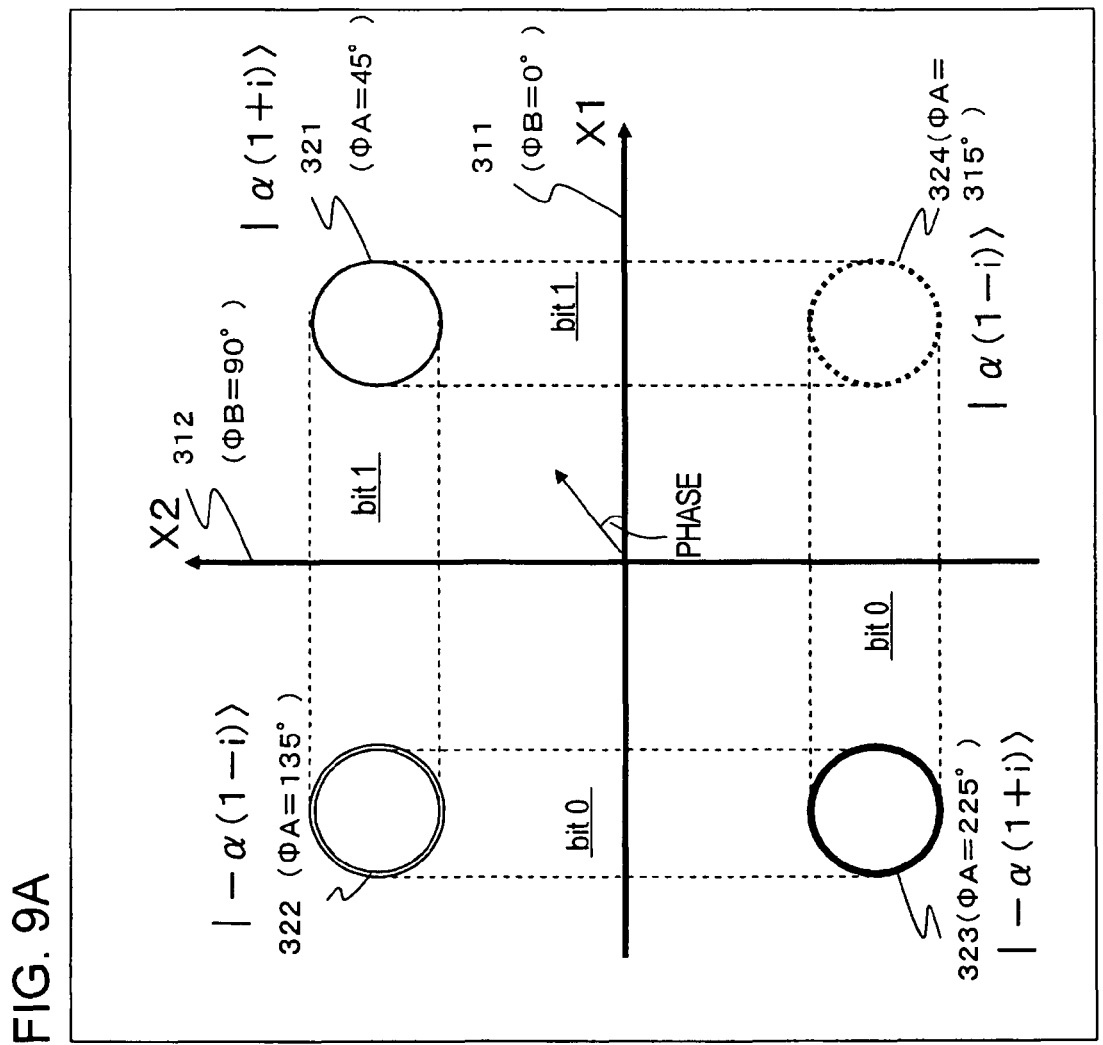
FIG. 9A shows a phase modulation process performed on a data sending side and a phase modulation process performed on a data receiving side in quantum cryptography communication in a mode with four phase modulation states on the sending side and two phase modulation bases on the receiving side, according to an embodiment of the present invention.

FIG. 9A shows an example of a quantum cryptography communication process in a mode with four phase modulation states on the sending side and two phase modulation bases on the receiving side. In this figure, fluctuations of transmitted coherent states (of laser light) are represented in a complex plane. In FIG. 9A, four circles indicate angles of phase modulation performed by the phase modulator 103 of the quantum cryptography communication apparatus 100 serving as the data transmitting apparatus. More specifically, these four circles respectively indicate quantum states (coherent states) of 45° modulation data 321, 135° modulation data 322, 225° modulation data 323, and 315° modulation data 324. The distance from the origin to the center of each circle is proportional to the square root of the average number of photons in the coherent state corresponding to the circle. For any set of two circles, the angle between the line extending from the origin to the center of one circle and the line from the origin to the center of the other circle indicates the phase difference between corresponding two coherent states. The radius of each circle indicates the fluctuation of the corresponding quantum state.

In the quantum cryptography communication system using the homodyne detection shown in FIG. 8, on the sending side, a coherent state is randomly selected from the four coherent states respectively corresponding to angles of phase modulation 45°, 135°, 225°, and 315° performed by the phase modulator 103, and light modulated into the selected coherent state is transmitted. On the receiving side, phase modulation is performed by one of 0° and 90° by the phase modulator 202, and homodyne detection is performed using the photodiodes 204 and 205, the amplifier 207, and the voltage measurement unit 208.

Figure 10:
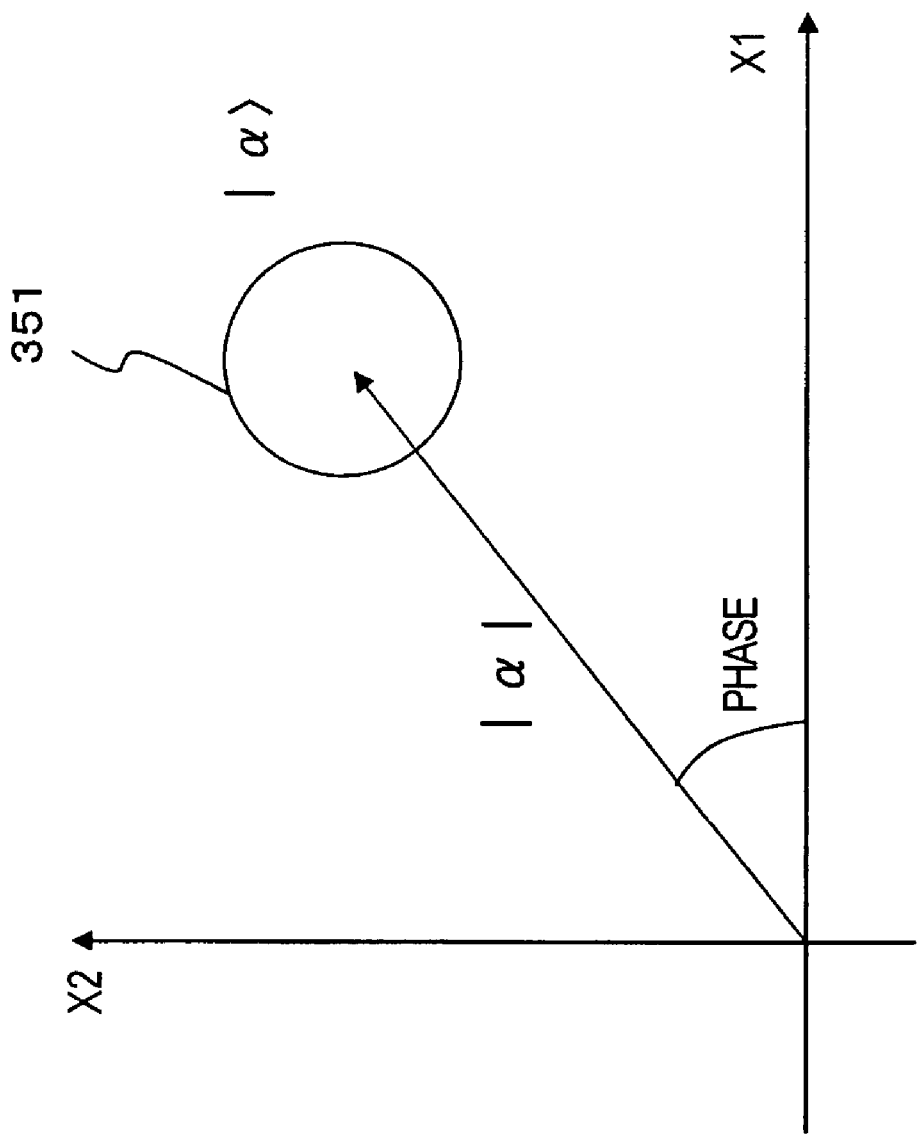
FIG. 10 is an explanation of a description of a coherent state shown in FIG. 9.

With reference to FIG. 10, the representation of coherent states shown in FIG. 9 is explained. When the quantum state of laser light is coherent, the coherent state can be expressed by a function called a Wigner function in a two-dimensional plane, as described below:

$$W(x, y) = (2/\pi)\exp[-2(x_1 - X)^{2} - 2(x_2 - Y)^2]$$

Herein, α=X+iY is referred to as the complex amplitude of the coherent state.

$$\tan\Phi = X/Y, \text{ and thus } \alpha = |\alpha|e^{i\Phi}.$$

The phase modulation of a light pulse refers to changing the value of the phase Φ. On the other hand, the intensity modulation refers to changing the magnitude |α| of α. n=|α²| corresponds to the average number of photons in a coherent state, that is, the average number of photons included in a light pulse, and indicates the strength of the energy of the light pulse.

The coherent state can be schematically represented by contour lines of the Wigner function. In FIG. 10, in the two-dimensional plane where the Wigner function is defined, a circle 351 is a contour line indicating a range within which a quantum state fluctuates. The coherent state inside this circle 351 is represented by |α>. At the center of this circle 351, phase=Φ. The distance from the origin to the center of the circle 351 is equal to the magnitude |α| of the complex amplitude of the coherent state and is proportional to the square root of the average number of photons in the coherent state.

Referring again to FIG. 9, a further explanation is given below as to the process in the mode with the four phase modulation states on the sending side and the two phase modulation bases on the receiving side according to the present embodiment of the invention. In FIG. 9A, the four circles indicate, in the complex plane, fluctuations of coherent states (of laser light) transmitted from the sender. Circles corresponding to respective modulation data 321 to 324 represent angles of modulation performed by the phase modulator 103 of the quantum cryptography communication apparatus 100 serving as the data transmitting apparatus, that is, the circles respectively represent the quantum states (coherent states) of four modulation data: 45° modulation data 321, 135° modulation data 322, 225° modulation data 323, and 315° modulation data 324. The distance from the origin to the center of each circle is proportional to the square root of the average number of photons in the coherent state corresponding to the circle. For any set of two circles, the angle between the line extending from the origin to the center of one circle and the line from the origin to the center of the other circle indicates the phase difference between corresponding two coherent states. The radius of each circle indicates the fluctuation of the corresponding quantum state.

On the other hand, on the receiving side, the phase modulation by the phase modulator 202 of the quantum cryptography communication apparatus 200 is performed by an angle of either 0° or 90°. These two phases respectively correspond to bases (used in the phase modulation performed on the receiving side) represented by orthogonal axes X1 and X2 shown in FIG. 9. That is, the 0° phase modulation corresponds to the basis X1 311, and the 90° phase modulation corresponds to the basis X2 312.

In the present description, the observation system applied on the receiving side is referred to as the basis of phase modulation on the receiving side. In the present mode, two phase modulation bases are used on the receiving side. That is, the present mode has four phase modulation states on the sending side and two phase modulation bases on the receiving side.

For the purpose of comparison, FIG. 9B shows phase modulation in the conventional system described earlier with reference to FIGS. 6 and 7. As can be seen from the comparison of FIGS. 9A and 9B, in the conventional system, light is phase-modulated by the phase modulator on the sending side by an angle selected from 0°, 90°, 180°, and 270°, and resultant light in corresponding one of the four coherent states is transmitted. On the receiving side, the light is phase-modulated by the phase modulator by 0° or 90°, and homodyne detection is performed. In contrast, in the present mode according to the present embodiment of the invention, as shown in FIG. 9A, light is phase-modulated by the phase modulator 103 (FIG. 8) on the sending side by an angle selected from 45°, 135°, 225°, and 315°, and resultant light in corresponding one of the four coherent states is transmitted. On the receiving side, the light is phase-modulated by the phase modulator 202 by 0° or 90° and homodyne detection is performed using the photodiodes 204 and 205, the amplifier 207, and the voltage measurement unit 208.

In the process shown in FIG. 9B, as described earlier, information can be shared only when the basis is matched. That is, information can be shared only when the combination of the angle of phase modulation (ΦA) performed on the sending side and the angle of phase modulation (ΦB) performed on the receiving side is one of the following four combinations: when the angle of phase modulation (ΦB) performed on the data receiving side is equal to π/2, and the angle of phase modulation (ΦA) performed on the data sending side is equal to π/2 or 3π/2, or when the angle of phase modulation (ΦB) performed on the data receiving side is equal to 0, and the angle of phase modulation (ΦA) performed on the data sending side is equal to 0 or π.

However, information cannot be shared in any other combination in which the basis is not matched.

In the present embodiment of the invention, although on the receiving side, the phase modulation is performed by 0° or 90° as in the known scheme shown in FIG. 9B, the phase modulation on the sending side is performed by one of 45°, 135°, 225°, and 315°, which are different from the phase modulation angles in the known scheme shown in FIG. 9B.

More specifically, on the data sending side, 45°, 135°, 225°, and 315° are defined as a set of angles of phase modulation corresponding to quantum states (coherent states). These angles of phase modulation are randomly selected, and phase modulation is performed by the selected angles by the phase modulator 103 of the quantum cryptography communication apparatus 100 serving as the data transmitting apparatus described earlier with reference to FIG. 8, and the resultant phase-modulated light is transmitted. For example, on the data sending side, a sequence of numbers randomly selected from values 0, 1, 2, and 3 is generated, and the values 0, 1, 2, and 3 are respectively assigned to the angles of phase modulation 45°, 135°, 225°, and 315°. Furthermore, phase modulation is performed by angles sequentially determined in accordance with the sequence of random numbers, and a resultant phase modulation signal is transmitted.

On the data receiving side, the finite number of coherent states of data received from the data sending side are observed. The observation process includes the following steps.

a) A plurality of bases for use as the observation system are defined, that is, bases (applied in the phase modulation performed on the receiving side) respectively corresponding to the angles of phase modulations 0° and 90° are defined.

b) Homodyne detection is performed by randomly selecting the plurality of observation systems, that is, the bases corresponding to the respective angles of phase modulation 0° and 90°.

The observation process described above is performed as the homodyne detection process using the randomly selected bases (corresponding to the respective angles of phase modulation) by the phase modulator 202 of the quantum cryptography communication apparatus 200 serving as the data receiving apparatus described above with reference to FIG. 8.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the four quantum states (coherent states) corresponding to 45°, 135°, 225°, and 315° applied on the data receiving side, and information indicating the assigned bit values is transmitted to the receiving side.

In the present embodiment, in the case in which phase modulation of 0° (the phase amplitude X1) is used in the measurement performed on the receiving side, a bit 1 is assigned to coherent states of 45° and 315° and a bit 0 is assigned to coherent states of 135° and 225° on the sending side. That is, if the phase modulation of 0° is performed, that is, the basis X1 311 shown in FIG. 9A is used in the measurement performed on the receiving side, then, on the sending side, the bit 1 is assigned to the two coherent states of the 45° modulation data 321 and the 315° modulation data 324, and the bit 0 is assigned to the two coherent states of the other data, that is, the 135° modulation data 322 and the 225° modulation data 323.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, two bit values are assigned to four respective states, the probability that transmission does not make a contribution to sharing of information such as a common secret key because of mismatching of the basis between the sending side and the receiving side can be reduced to 0.

Referring to FIGS. 11A to 11C, the coding efficiency of the quantum cryptography according to the present embodiment of the invention is described below. FIG. 11A shows an example in which phase modulation of 0° (the phase amplitude X1) is employed in the measurement performed on the receiving side. In this figure, circles 321 to 324 correspond to angles of phase modulation performed by the phase modulator 103 of the quantum cryptography communication apparatus 100 serving as the data transmitting apparatus. More specifically, these four circles respectively indicate the 45° modulation data 321, the 135° modulation data 322, the 225° modulation data 323, and the 315° modulation data 324. In the case in which phase modulation of 0° (the phase amplitude X1) is used in the measurement performed on the receiving side, bit values are assigned as follows.

45° modulation data 321=bit 1
315° modulation data 324=bit 1
135° modulation data 322=bit 0
225° modulation data 323=bit 0

FIG. 11B shows an example in which phase modulation of 90° (the phase amplitude X2) is employed in the measurement performed on the receiving side. In this case, bit values are assigned as follows.

45° modulation data 321=bit 1
135° modulation data 322=bit 1
225° modulation data 323=bit 0
315° modulation data 324=bit 0

FIG. 11C is a table showing correspondence in terms of the states. In this table shown in FIG. 1C, angles of phase modulation ($\Phi A$) performed on the data sending side are shown in a row (A), angles of phase modulation ($\Phi B$) performed on the data receiving side are shown in a row (B), shared bits are shown in a row (C), and the sharable bit ratio is shown in a row (D).

More specifically, the row (A) shows angles of phase modulation ($\Phi A$) employed in the phase modulation process (shown in FIGS. 11A and 11B) performed on the data sending side to obtain four respective modulation signals, that is, 45° modulation data 321, 135° modulation data 322, 225° modulation data 323, and 315° modulation data 324.

The row (B) shows the angles of phase modulation ($\Phi B$) performed on the data receiving side, which correspond to two bases employed as observation systems (shown in FIGS. 11A and 11B) on the receiving side. As shown, the angle of phase modulation performed on the data receiving side is equal to 0° or 90°.

When the four phase modulation signals ($\Phi A$=45°, 135°, 225°, 315°) are arbitrarily and randomly selected on the sending side, and two angles of phase modulation ($\Phi B$=0°, 90°) are randomly selected as the observation system on the receiving side, eight combinations shown in FIG. 11C equally occur.

The row (C) of the table shown in FIG. 11C indicates bit information shared by both sender and receiver. As described earlier, the assignment of the bit values is changed depending on the observation system employed on the receiving side so that bit value sharing is possible in any of the eight combinations. That is, bit value sharing is possible in any of eight combinations of the angle of phase modulation (performed on the sending side) selected from the four values and the angle of phase modulation (performed on the receiving side) selected from the two values, and thus the sharable information ratio is 100% as indicated in the row (D).

Figure 12:
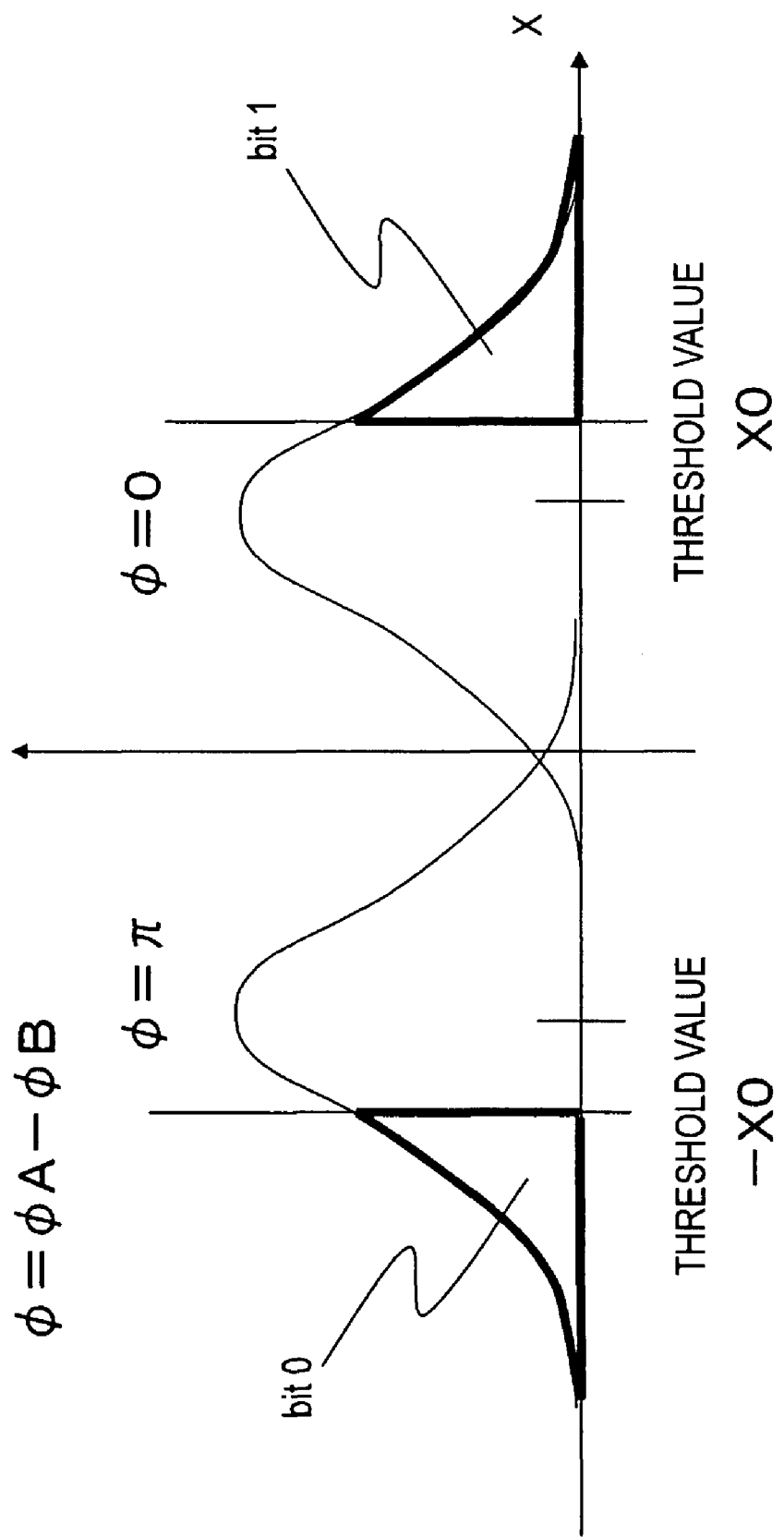
FIG. 12 shows a bit identification process based on threshold values in a detection process on a data receiving side.

As shown in FIG. 12, the quantum cryptography communication apparatus 200 serving as the data receiving apparatus detects and identifies the signal. More specifically, the data used to identify the signal is the difference, $\Phi=|\Phi A-\Phi B|$, between the angle of phase modulation ($\Phi A$) performed on the data sending side and the angle of phase modulation ($\Phi B$) performed on the data receiving side. The bit value is identified by determining whether the phase of the detection signal is $\Phi=0$ or $\Phi=\pi$. As shown in FIG. 12, the bit value is determined based on an observed value and predetermined threshold values (X0 and −X0), and the determined bit value is shared.

Quantum Cryptography Communication Process with Three Phase Modulation States on Sending Side and Three Phase Modulation Bases on Receiving Side In the quantum cryptography communication system described earlier with reference to FIG. 8, a quantum cryptography communication process may be performed in a mode with three phase modulation states on the sending side and three phase modulation bases on the receiving side according to an embodiment of the present invention. In this mode, phase modulation by the phase modulator 103 of the quantum cryptography communication apparatus 100 serving as the data transmitting apparatus and phase modulation by the phase modulator 202 of the quantum cryptography communication apparatus 200 serving as the data receiving apparatus are performed as described below.

Figure 13:
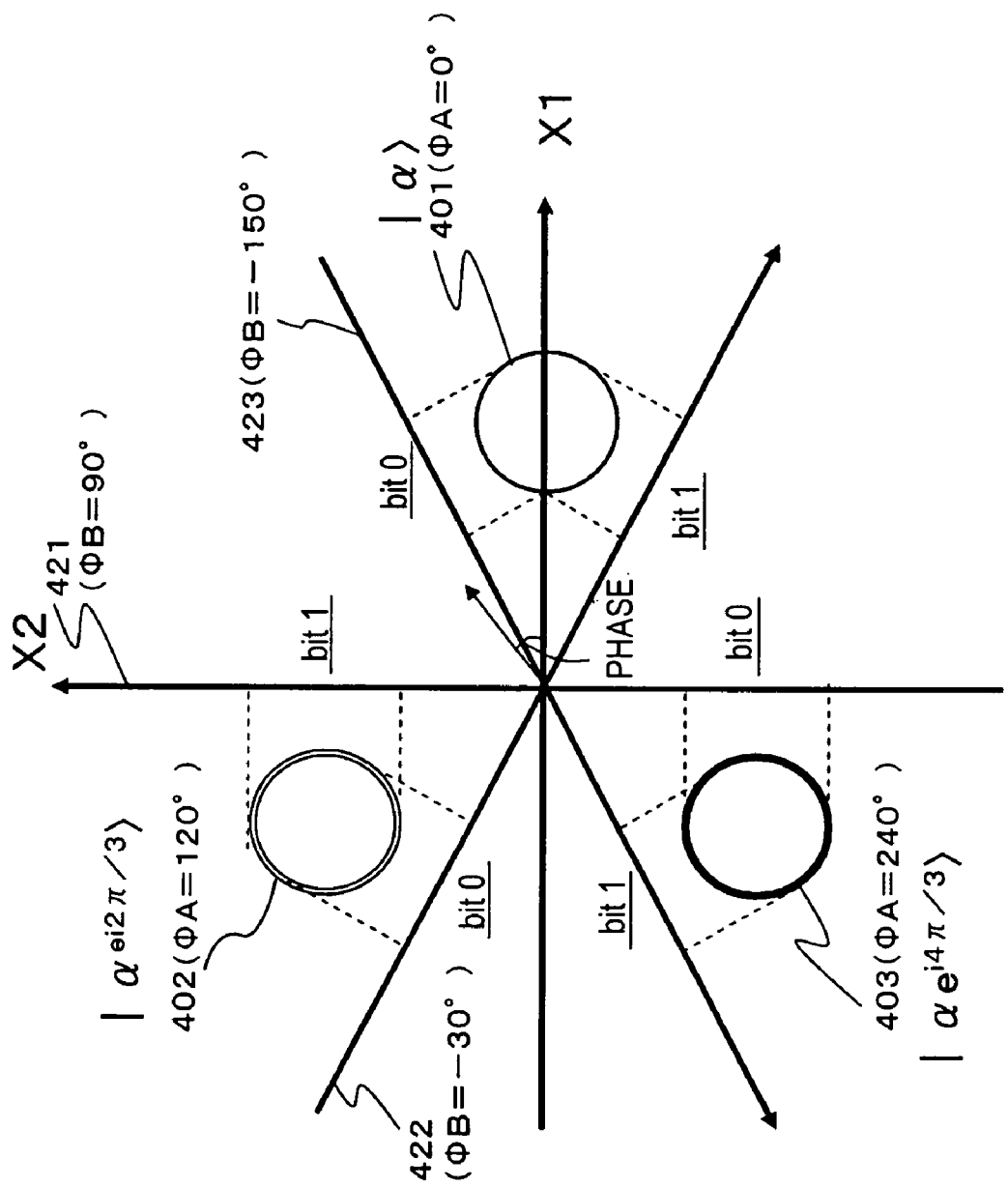
FIG. 13 shows a phase modulation process performed on a data sending side and a phase modulation process performed on a data receiving side in quantum cryptography communication in a mode with three phase modulation states on the sending side and three phase modulation bases on the receiving side, according to an embodiment of the present invention.

FIG. 13 represents, in a complex plane, fluctuations of coherent states (of laser light) transmitted from the sending side. Modulation data 401 to 403 respectively denoted by three circles in FIG. 13 correspond to angles of phase modulation performed by the phase modulator 103 of the quantum cryptography communication apparatus 100 serving as the data transmitting apparatus. More specifically, these three circles respectively indicate quantum states (coherent states) of the 0° modulation data 401, the 120° modulation data 402, and the 240° modulation data 403. The distance from the origin to the center of each circle is proportional to the square root of the number of photons in the coherent state corresponding to the circle. The radius of each circle indicates the fluctuation of the corresponding quantum state.

On the other hand, on the receiving side, the phase modulation by the phase modulator 202 of the quantum cryptography communication apparatus 200 is performed by an angle of one of 90°, −30°, and −150°. These three phases respectively correspond to a basis (used in the phase modulation performed on the receiving side) represented by an axis 421 (ΦB=90°), a basis (used in the phase modulation performed on the receiving side) represented by an axis 422 (ΦB=−30°), and a basis (used in the phase modulation performed on the receiving side) represented by an axis 423 (ΦB=−150°), shown in FIG. 13.

In the quantum cryptography communication system using the homodyne detection shown in FIG. 8, on the sending side, a coherent state is randomly selected from the three coherent states respectively corresponding to angles of phase modulation 0°, 120°, and 240° performed by the phase modulator 103, and light modulated into the selected coherent state is transmitted. On the receiving side, a basis is randomly selected from the bases respectively corresponding to the angles of phase modulation 90°, −30°, and −150°, and phase modulation is performed by the phase modulator 202 using the selected basis. Furthermore, homodyne detection is performed using the photodiodes 204 and 205, the amplifier 207, and the voltage measurement unit 208.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 120°, and 240° applied on the data receiving side, and information indicating the assigned bit values is transmitted to the receiving side.

In the present embodiment, in the case in which phase modulation of 90° (the phase amplitude X2) is used in the measurement performed on the receiving side, a bit 1 is assigned to the coherent state of 120°, and a bit 0 is assigned to the coherent state of 240° on the sending side. That is, if the measurement is performed using the basis (phase modulation on the receiving side) 421 corresponding to the 90° phase modulation axis (ΦB=90°) shown in FIG. 13, then, on the sending side, the bit 1 is assigned to the coherent state of the 120° modulation data 402, and the bit 0 is assigned to the coherent state of the 240° modulation data 403. The coherent state of the 0° modulation data 401 is treated as being undetectable because of the mismatching of the basis.

If phase modulation is performed by −30° on the receiving side, that is, if the measurement is performed using the basis (phase modulation on the receiving side) 422 corresponding to the −30° phase modulation axis (ΦB=−30°) shown in FIG. 13, then, on the sending side, the bit 1 is assigned to the coherent state of the 0° modulation data 401, and the bit 0 is assigned to the coherent state of the 120° modulation data 402. The coherent state of the 240° modulation data 403 is treated as being undetectable because of the mismatching of the basis.

If phase modulation is performed by −150° on the receiving side, that is, if the measurement is performed using the basis (phase modulation on the receiving side) 423 corresponding to the −150° phase modulation axis (ΦB=−150°) shown in FIG. 13, then, on the sending side, the bit 1 is assigned to the coherent state of the 240° modulation data 403, and the bit 0 is assigned to the coherent state of the 0° modulation data 401. The coherent state of the 120° modulation data 402 is treated as being undetectable because of the mismatching of the basis.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, different bit values are assigned to two of the three respective quantum states transmitted from the sending side, it is possible to use two of the three quantum states to transmit information to be shared. In this encoding scheme, the probability that transmission does not make a contribution to sharing of information such as a common secret key because of mismatching of the basis between the sending side and the receiving side can be reduced to ⅓.

Referring to FIG. 14, the coding efficiency in the present embodiment is described. In a table shown in FIG. 14, angles of phase modulation (ΦA) performed on the data sending side are shown in a row (A), angles of phase modulation (ΦB) performed on the data receiving side are shown in a row (B), shared bits are shown in a row (C), and the sharable bit ratio is shown in a row (D).

More specifically, the row (A) shows angles of phase modulation (ΦA) employed in the phase modulation process (shown in FIG. 13) performed on the data sending side to obtain three respective modulation signals, that is, 0° modulation data 401, 120° modulation data 402, and 240° modulation data 403.

The row (B) shows the angles of phase modulation (ΦB) performed on the data receiving side, which correspond to three bases employed as observation systems (shown in FIG. 13) on the receiving side. As shown, the angle of phase modulation performed on the data receiving side is equal to 90°, −30°, or −150°.

When the three phase modulation signals (ΦB=0°, 120°, 240°) are arbitrarily and randomly selected on the sending side, and three angles of phase modulation (ΦA=90°, −30°, −150°) are randomly selected on the receiving side, nine combinations shown in FIG. 14 equally occur.

The row (C) of the table shown in FIG. 14 indicates bit information shared by both sender and receiver. As described earlier, the assignment of the bit values is changed depending on the observation system employed on the receiving side so that bit value sharing is possible in six combination of the total of nine combinations. That is, bit value sharing is possible in six combinations of the total of nine combinations in terms of the angle of phase modulation (performed on the sending side) selected from the three values and the angle of phase modulation (performed on the receiving side) selected from the three values, although bit value sharing is impossible in the remaining three combinations because of the mismatching of the basis. Thus the sharable information ratio is as high as ⅔ as indicated in the row (D).

The quantum cryptography communication apparatus 200 serving as the data receiving apparatus detects and identifies the signal, as described earlier with reference to FIG. 12. More specifically, the data used to identify the signal is the difference, $\Phi=|\Phi A-\Phi B|$, between the angle of phase modulation ($\Phi A$) performed on the data sending side and the angle of phase modulation ($\Phi B$) performed on the data receiving side.

The bit value is identified by checking the phase of the detection signal, that is, by determining whether $\Phi$ mod $2\pi=\pi/6$ or $\Phi$ mod $2\pi=5\pi/6$. As shown in FIG. 12, the bit value is determined based on an observed value and predetermined threshold values (X0 and $-$X0), and the determined bit value is shared.

In the present embodiment, as shown in the row (D) in FIG. 14, as high a value as $2/3$ can be obtained as the sharable information ratio, that is, the probability that bit values are shared by the data sending side and the receiving side, and thus the effective information ratio can be increased from $1/2$ obtained in the technique described earlier with reference to FIGS. 6 and 7. As described above, by performing encoding such that, depending on the mode in which the measurement is performed on the receiving side, two bit values are assigned to three respective states, the number of measurement results that do not make a contribution to transmission of the secret key because of the mismatching of the basis is reduced to $1/3$ of the total number of measurement results. In other words, $2/3$ of the total number of measurement results make a contribution to generation of the secret key, and thus an improvement in the efficiency is achieved.

Quantum Cryptography Communication Process with Six Phase Modulation States on Sending Side and Three Phase Modulation Bases on Receiving Side In the quantum cryptography communication system described earlier with reference to FIG. 8, a quantum cryptography communication process may be performed in a mode with six phase modulation states on the sending side and three phase modulation bases on the receiving side according to an embodiment of the present invention. In this mode, phase modulation by the phase modulator 103 of the quantum cryptography communication apparatus 100 serving as the data transmitting apparatus and phase modulation by the phase modulator 202 of the quantum cryptography communication apparatus 200 serving as the data receiving apparatus are performed as described below.

Figure 15:
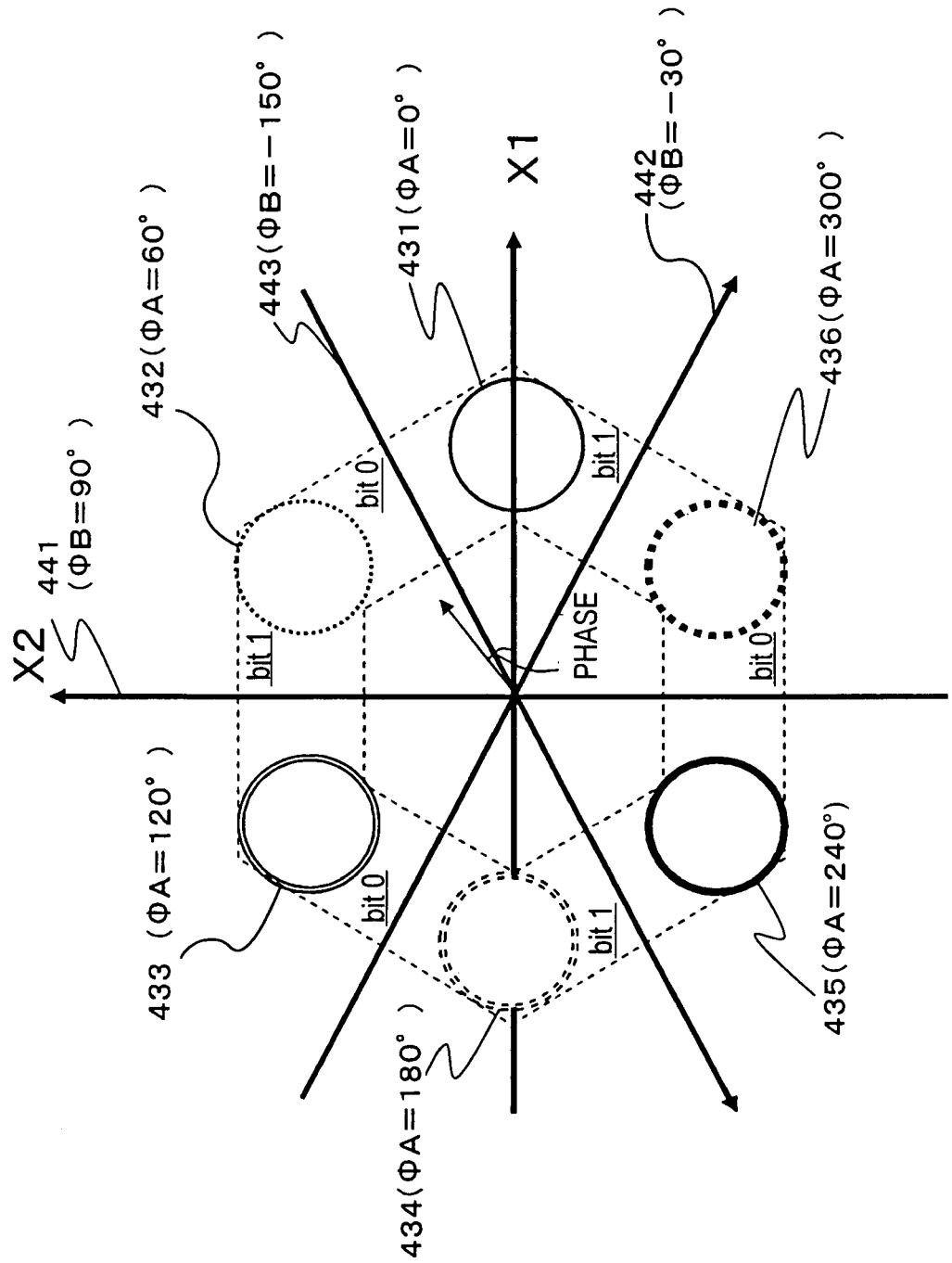
FIG. 15 shows a phase modulation process performed on a data sending side and a phase modulation process performed on a data receiving side in quantum cryptography communication in a mode with six phase modulation states on the sending side and three phase modulation bases on the receiving side, according to an embodiment of the present invention.

FIG. 15 represents, in a complex plane, fluctuations of coherent states (of laser light) transmitted from the sending side. Six circles 431 to 436 shown in FIG. 15 correspond to angles of phase modulation performed by the phase modulator 103 of the quantum cryptography communication apparatus 100 serving as the data transmitting apparatus. More specifically, these six circles respectively indicate quantum states (coherent states) of 0° modulation data 431, 60° modulation data 432, 120° modulation data 433, 180° modulation data 434, 240° modulation data 435, and 300° modulation data 436. The distance from the origin to the center of each circle is proportional to the square root of the number of photons in the coherent state corresponding to the circle. The radius of each circle indicates the fluctuation of the corresponding quantum state.

On the other hand, on the receiving side, the phase modulation by the phase modulator 202 of the quantum cryptography communication apparatus 200 is performed by an angle of one of 90°, $-30°$, and $-150°$. These three phases respectively correspond to a basis (used in the phase modulation performed on the receiving side) represented by an axis 441 ($\Phi B=90°$), a basis (used in the phase modulation performed on the receiving side) represented by an axis 442 ($\Phi B=-30°$), and a basis (used in the phase modulation performed on the receiving side) represented by an axis 443 ($\Phi B=-150°$), shown in FIG. 15.

In the quantum cryptography communication system using the homodyne detection shown in FIG. 8, on the sending side, a coherent state is randomly selected from the six coherent states respectively corresponding to angles of phase modulation 0°, 60°, 120°, 180°, 240°, and 300° performed by the phase modulator 103, and light modulated into the selected coherent state is transmitted. On the receiving side, a basis is randomly selected from the bases respectively corresponding to the angles of phase modulation 90°, $-30°$, and $-150°$, and phase modulation is performed by the phase modulator 202 using the selected basis. Furthermore, homodyne detection is performed using the photodiodes 204 and 205, the amplifier 207, and the voltage measurement unit 208.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 60°, 120°, 180°, 240°, and 300° applied on the data receiving side, and information indicating the assigned bit values is transmitted to the receiving side.

In the present embodiment, in the case in which phase modulation of 90° (the phase amplitude X2) is used in the measurement performed on the receiving side, a bit 1 is assigned to coherent states of 60° and 120° and a bit 0 is assigned to coherent states of 240° and 300° on the sending side. That is, if the measurement is performed using the basis (phase modulation on the receiving side) 441 corresponding to the 90° phase modulation axis ($\Phi B=90°$) shown in FIG. 13, then, on the sending side, the bit 1 is assigned to the respective two coherent states of the 60° modulation data 432 and the 120° modulation data 433, and the bit 0 is assigned to the respective two coherent states of the 240° modulation data 435 and the 300° modulation data 436. The coherent states of the 0° modulation data 431 and the 180° modulation data 434 are treated as being undetectable because of the mismatching of the basis.

If phase modulation is performed by $-30°$ on the receiving side, that is, if the measurement is performed using the basis (phase modulation on the receiving side) 442 corresponding to the $-30°$ phase modulation axis ($\Phi B=-30°$) shown in FIG. 15, then, on the sending side, the bit 1 is assigned to the respective two coherent states of the 0° modulation data 431 and the 300° modulation data 436, and the bit 0 is assigned to the respective two coherent states of the 120° modulation data 433 and the 180° modulation data 434. The coherent states of the 60° modulation data 432 and the 240° modulation data 435 are treated as being undetectable because of the mismatching of the basis.

If phase modulation is performed by $-150°$ on the receiving side, that is, if the measurement is performed using the basis (phase modulation on the receiving side) 443 corresponding to the $-150°$ phase modulation axis ($\Phi B=-150°$) shown in FIG. 15, then, on the sending side, the bit 1 is assigned to the respective two coherent states of the 180° modulation data 434 and the 240° modulation data 435, and the bit 0 is assigned to the respective two coherent states of the 0° modulation data 431 and the 60° modulation data 432. The coherent states of the 120° modulation data 433 and the 300° modulation data 436 are treated as being undetectable because of the mismatching of the basis.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to respective four of the six quantum states transmitted from the sending side, it is possible to use four of the six quantum states to transmit information to be shared. In this encoding scheme, the probability that transmission does not make a contribution to sharing of information such as a common secret key because of mismatching of the basis between the sending side and the receiving side can be reduced to $1/3$.

Referring to FIGS. 16A and 16B, the coding efficiency in the present embodiment is described. In tables shown in FIGS. 16A and 16B, angles of phase modulation ($\Phi A$) performed on the data sending side are shown in a row (A), angles of phase modulation ($\Phi B$) performed on the data receiving side are shown in a row (B), shared bits are shown in a row (C), and the sharable bit ratio is shown in a row (D).

More specifically, the row (A) shows angles of phase modulation ($\Phi A$) employed in the phase modulation process (shown in FIG. 15) performed on the data sending side to obtain six respective modulation signals, that is, 0° modulation data 431, 60° modulation data 432, 120° modulation data 433, 180° modulation data 434, 240° modulation data 435, and 300° modulation data 436.

The row (B) shows the angles of phase modulation ($\Phi B$) performed on the data receiving side, which correspond to three bases employed as observation systems (shown in FIG. 15) on the receiving side. As shown, the angle of phase modulation performed on the data receiving side is equal to 90°, −30°, or −150°.

When the six phase modulation signals ($\Phi B$=0°, 60°, 120°, 180°, 240°, 300°) are arbitrarily and randomly selected on the sending side, and three angles of phase modulation ($\Phi A$=90°, −30°, −150°) are randomly selected on the receiving side, eighteen combinations shown in FIGS. 16A and 16B equally occur.

The row (C) of the tables shown in FIGS. 16A and 16B indicates bit information shared by both sender and receiver. As described earlier, the assignment of the bit values is changed depending on the observation system employed on the receiving side so that bit value sharing is possible in twelve combination of the total of eighteen combinations. That is, bit value sharing is possible in twelve combinations of the total of eighteen combinations in terms of the angle of phase modulation (performed on the sending side) selected from the six values and the angle of phase modulation (performed on the receiving side) selected from the three values, although bit value sharing is impossible in the remaining six combinations because of the mismatching of the basis. Thus the sharable information ratio is as high as $2/3$ as indicated in the row (D).

The quantum cryptography communication apparatus 200 serving as the data receiving apparatus detects and identifies the signal, as described earlier with reference to FIG. 12. More specifically, the data used to identify the signal is the difference, $\Phi=|\Phi A-\Phi B|$, between the angle of phase modulation ($\Phi A$) performed on the data sending side and the angle of phase modulation ($\Phi B$) performed on the data receiving side.

The bit value is identified by checking the phase of the detection signal, that is, by determining whether $\Phi$ mod $\pi=\pi/6$ or $\Phi$ mod $\pi=5\pi/6$. As shown in FIG. 12, the bit value is determined based on an observed value and predetermined threshold values (X0 and −X0), and the determined bit value is shared.

In the present embodiment, as shown in the row (D) in FIGS. 16A and 16B, as high a value as $2/3$ can be obtained as the sharable information ratio, that is, the probability that bit values are shared by the data sending side and the receiving side, and thus the effective information ratio can be increased from $1/2$ obtained in the technique described earlier with reference to FIGS. 6 and 7.

Quantum Cryptography Communication Process with Eight Phase Modulation States on Sending Side and Two Phase Modulation Bases on Receiving Side In the quantum cryptography communication system described earlier with reference to FIG. 8, a quantum cryptography communication process may be performed in a mode with eight phase modulation states on the sending side and two phase modulation bases on the receiving side according to an embodiment of the present invention. In this mode, phase modulation by the phase modulator 103 of the quantum cryptography communication apparatus 100 serving as the data transmitting apparatus and phase modulation by the phase modulator 202 of the quantum cryptography communication apparatus 200 serving as the data receiving apparatus are performed as described below.

Figure 17:
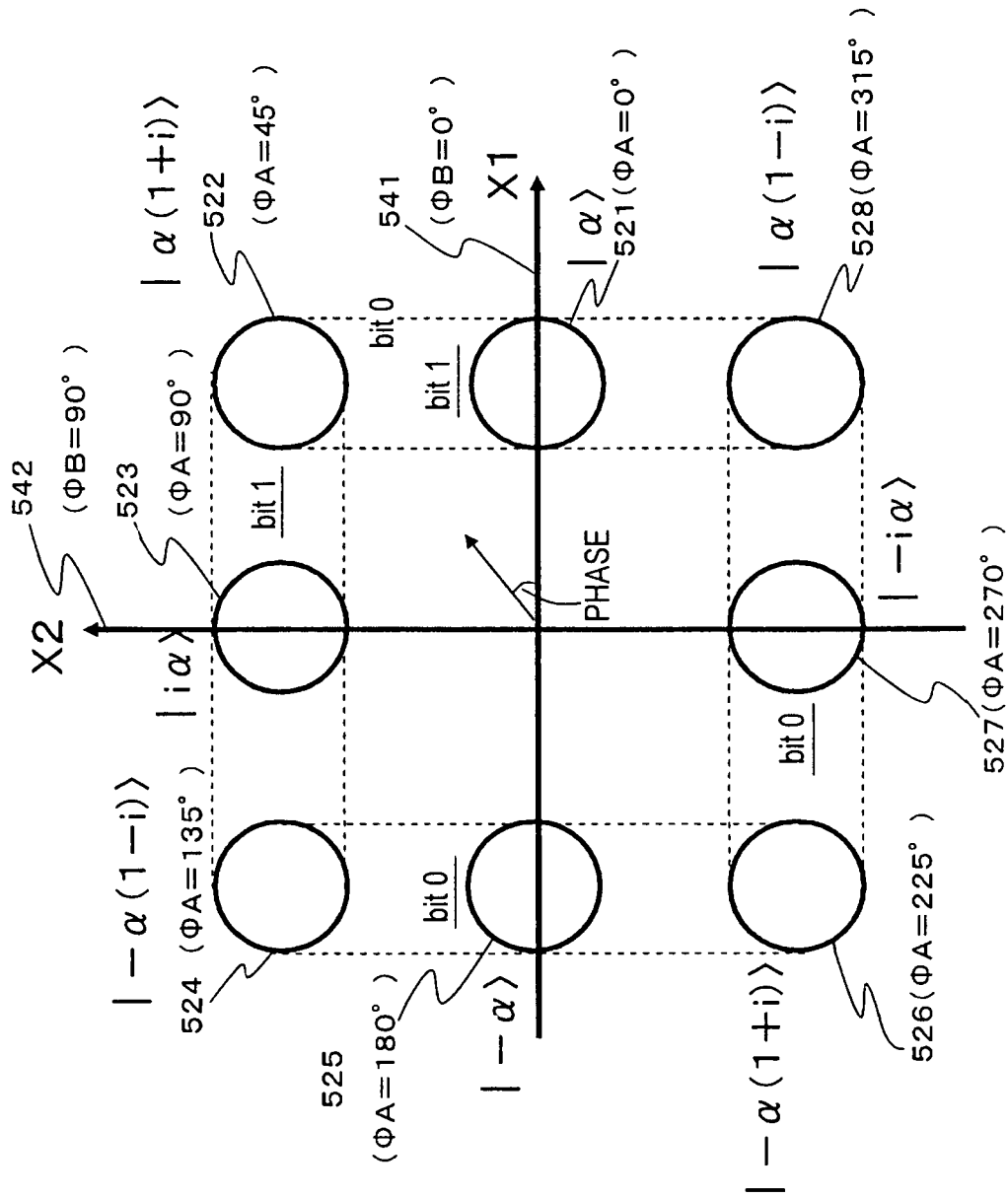
FIG. 17 shows a phase modulation process performed on a data sending side and a phase modulation process performed on a data receiving side in quantum cryptography communication in a mode with eight phase modulation states on the sending side and two phase modulation bases on the receiving side, according to an embodiment of the present invention.

FIG. 17 represents, in a complex plane, of fluctuations of coherent states (of laser light) transmitted from the sending side. Eight circles 521 to 528 shown in FIG. 17 correspond to angles of phase modulation performed by the phase modulator 103 of the quantum cryptography communication apparatus 100 serving as the data transmitting apparatus. More specifically, these eight circles respectively indicate quantum states (coherent states) of 0° modulation data 521, 45° modulation data 522, 90° modulation data 523, 135° modulation data 524, 180° modulation data 525, 225° modulation data 526, 270° modulation data 527, and 315° modulation data 528. The distance from the origin to the center of each circle is proportional to the square root of the number of photons in the coherent state corresponding to the circle. The radius of each circle indicates the fluctuation of the corresponding quantum state.

On the other hand, on the receiving side, the phase modulation by the phase modulator 202 of the quantum cryptography communication apparatus 200 is performed by an angle of either 0° or 90°. These two phases respectively correspond to a basis (used in the phase modulation performed on the receiving side) 541 represented by an axis X1 ($\Phi B$=0°), and a basis (used in the phase modulation performed on the receiving side) 542 represented by an axis X2 ($\Phi B$=90°), shown in FIG. 17.

The distance from the origin to the center of each circle corresponds to the square root of the average number of photons in the coherent state corresponding to the circle. In the present mode, the distance from the origin to the circle center is difference between a group including 0° modulation data 521, 90° modulation data 523, 180° modulation data 525, and 270° modulation data 527, and a group including 45° modulation data 522, 135° modulation data 524, 225° modulation data 526, and 315° modulation data 528, and thus the average numbers of photos in the corresponding coherent states are difference between these two groups.

To this end, the quantum cryptography communication apparatus 100 on the sending side needs to include a part for changing the number of photons depending on the coherent state shown in FIG. 17. Referring to FIG. 18, the structure of a quantum cryptography communication apparatus 600 capable of generating eight coherent states shown in FIG. 17 is described below.

The quantum cryptography communication apparatus 600 shown in FIG. 18A is difference from the quantum cryptography communication apparatus 100 on the data sending side shown in FIG. 8 in that the quantum cryptography communication apparatus 600 additionally includes an attenuator 601 disposed at a stage following the phase modulator 103. The attenuator 601 adjusts the intensity, that is, the number of photons, of signal light including the signal light (S) after phase modulation is performed by the phase modulator 103. That is, the attenuator 601 makes the adjustment to achieve the eight coherent states shown in FIG. 18B.

More specifically, as shown in FIG. 18C, when the phase modulator 103 performs phase modulation by an angle equal to one of 0°, 90°, 180°, and 270°, the adjustment is made such that the number of photons is reduced to ½, while the phase modulation is performed by one of 45°, 135°, 225°, and 315°, the number of photons is adjusted by a factor of 1 (that is, no adjustment is made). As a result of the adjustment, the eight coherent states shown in FIG. 18B or FIG. 17 are achieved.

After the phase modulation and the intensity modulation (adjustment of the number of photons) are performed, the resultant signal light and the reference light are transmitted. On the receiving side, the process is performed by the quantum cryptography communication apparatus 200 having a structure similar to that shown in FIG. 8. In the present embodiment, on the receiving side, coherent states are randomly selected from the allowed eight coherent states respectively corresponding angles of phase modulation 0°, 45°, 90°, 135°, 180°, 225°, 270°, and 315°, and the phase modulation and the intensity modulation (adjustment of the number of photons) are respectively performed by the phase modulator 103 and the attenuator 601 so as to achieve the selected coherent states. The resultant light in the coherent states is transmitted. On the receiving side, a basis is randomly selected from the bases respectively corresponding to the angles of phase modulation 0° and 90°, and phase modulation is performed by the phase modulator 202 (FIG. 8) using the selected basis, and homodyne detection is performed using the photodiodes 204 and 205, the amplifier 207, and the voltage measurement unit 208.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 0°, 45°, 90°, 135°, 180°, 225°, 270°, and 315° applied on the data receiving side, and information indicating the assigned bit values is transmitted to the receiving side.

In the present embodiment, if the measurement is performed using the basis (phase modulation on the receiving side) 541 corresponding to the 0° phase modulation axis (ΦB=0°) shown in FIG. 17, then, on the sending side, the bit 1 is assigned to the respective three coherent states of the 0° modulation data 521, the 45° modulation data 522, and the 315° modulation data 528, and the bit 0 is assigned to the respective three coherent states of the 135° modulation data 524, the 180° modulation data 525, and the 225° modulation data 526. The coherent states of the 90° modulation data 523 and the 270° modulation data 527 are treated as being undetectable because of the mismatching of the basis.

If the measurement is performed using the basis (phase modulation on the receiving side) 542 corresponding to the 90° phase modulation axis (ΦB=90°) shown in FIG. 17, then, on the sending side, the bit 1 is assigned to the respective coherent states of the 45° modulation data 522, the 90° modulation data 523, and the 135° modulation data 524, and the bit 0 is assigned to the respective coherent states of the 225° modulation data 526, the 270° modulation data 527, and the 315° modulation data 528. The coherent states of the 0° modulation data 521 and the 180° modulation data 525 are treated as being undetectable because of the mismatching of the basis.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to respective six of the eight quantum states transmitted from the sending side, it is possible to use six of the eight quantum states to transmit information to be shared. In this encoding scheme, the probability that transmission does not make a contribution to sharing of information such as a common secret key because of mismatching of the basis between the sending side and the receiving side can be reduced to ¼.

Referring to FIG. 19, the coding efficiency in the present embodiment is described. In a table shown in FIG. 19, angles of phase modulation (ΦA) performed on the data sending side are shown in a row (A), angles of phase modulation (ΦB) performed on the data receiving side are shown in a row (B), shared bits are shown in a row (C), and the sharable bit ratio is shown in a row (D).

More specifically, the row (A) shows angles of phase modulation (ΦA) employed in the phase modulation process (shown in FIG. 17) performed on the data sending side to obtain eight respective modulation signals, that is, 0° modulation data 521, 45° modulation data 522, 90° modulation data 523, 135° modulation data 524, 180° modulation data 525, 225° modulation data 526, 270° modulation data 527, and 315° modulation data 528.

The row (B) shows the angles of phase modulation (ΦB) performed on the data receiving side, which correspond to two bases employed as observation systems (shown in FIG. 17) on the receiving side. As shown, the angle of phase modulation performed on the data receiving side is equal to 0°, or 90°.

When the eight phase modulation signals (ΦB=0°, 45°, 90°, 135°, 180°, 225°, 270°, 315°) are arbitrarily and randomly selected on the sending side, and two angles of phase modulation (ΦA=0°, 90°) are randomly selected on the receiving side, sixteen combinations shown in FIG. 19 equally occur.

The row (C) of the table shown in FIG. 19 indicates bit information shared by both sender and receiver. As described earlier, the assignment of the bit values is changed depending on the observation system employed on the receiving side so that bit value sharing is possible in twelve combination of the total of sixteen combinations. That is, bit value sharing is possible in twelve combinations of the total of sixteen combinations in terms of the angle of phase modulation (performed on the sending side) selected from the eight values and the angle of phase modulation (performed on the receiving side) selected from the two values, although bit value sharing is impossible in the remaining four combinations because of the mismatching of the basis. Thus the sharable information ratio is as high as ¾ as indicated in the row (D).

The quantum cryptography communication apparatus 200 serving as the data receiving apparatus detects and identifies the signal, as described earlier with reference to FIG. 12. More specifically, the data used to identify the signal is the difference, $\Phi=|\Phi A-\Phi B|$, between the angle of phase modulation ($\Phi A$) performed on the data sending side and the angle of phase modulation ($\Phi B$) performed on the data receiving side.

The bit value is identified by checking the phase of the detection signal, that is, by determining whether $\Phi \bmod \pi=0$ or $\pi/4$ or $\Phi \bmod \pi=3\pi/4$. As shown in FIG. 12, the bit value is determined based on an observed value and predetermined threshold values (X0 and −X0), and the determined bit value is shared.

In the present embodiment, as shown in the row (D) in FIG. 19, as high a value as ¾ can be obtained as the probability that bit values are shared by the data sending side and the receiving side, and thus the effective information ratio can be increased from ½ obtained in the technique described earlier with reference to FIGS. 6 and 7.

Quantum Cryptography Communication Process with Eight Phase Modulation States on Sending Side and Four Phase Modulation Bases on Receiving Side A description is now given herein as to a quantum cryptography communication process in a mode with eight phase modulation states on the sending side and four phase modulation bases on the receiving side according to an embodiment of the present invention. Although the present mode is similar to the immediately previous mode in that the mode has eight phase modulation states on the sending side, the intensity modulation, that is, the adjustment of the number of photons is not performed in the present mode. The quantum cryptography communication process in this mode can be performed using a quantum cryptography communication system configured in the same manner as that shown in FIG. 8.

Figure 20:
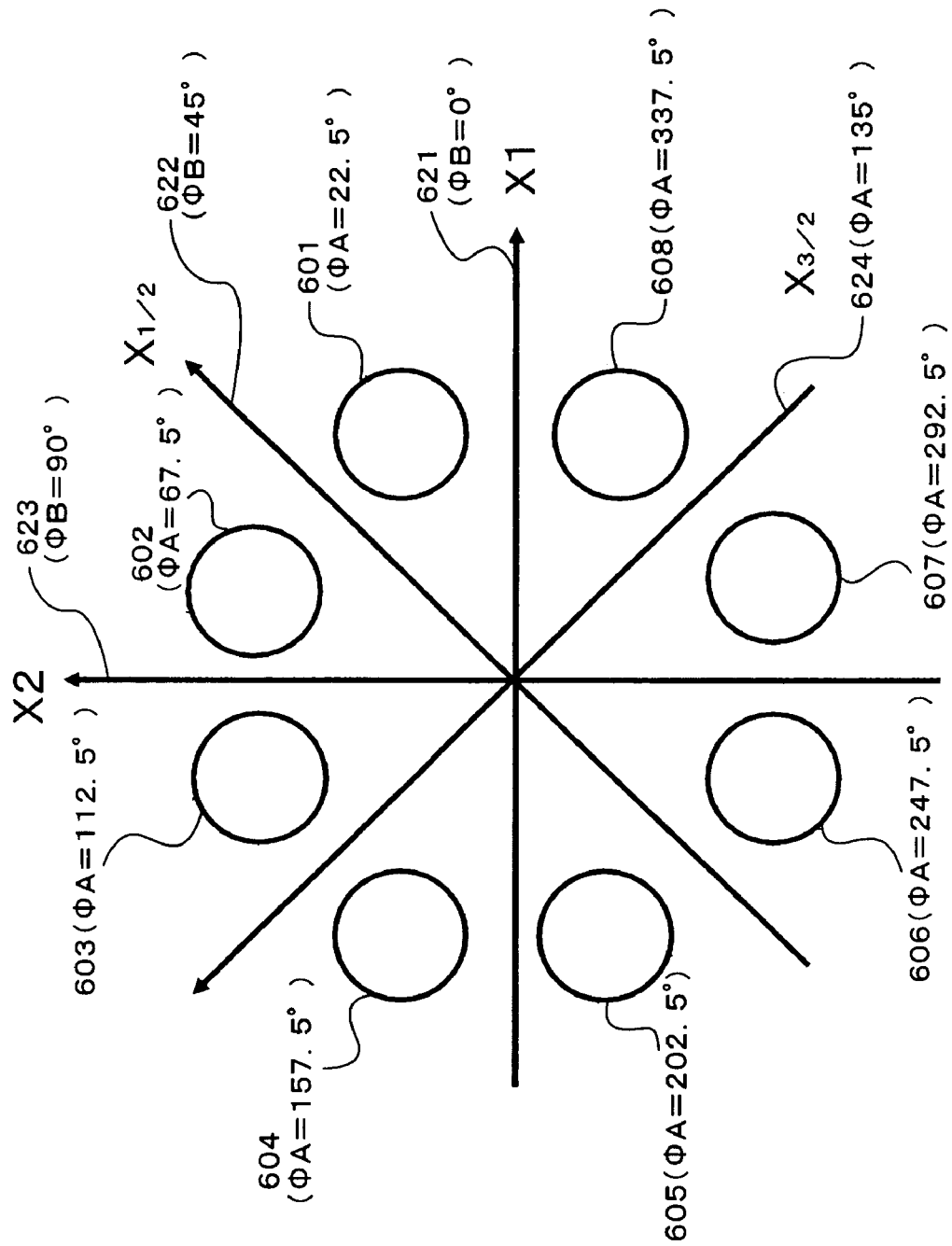
FIG. 20 shows a phase modulation process performed on a data sending side and a phase modulation process performed on a data receiving side in quantum cryptography communication in a mode with eight phase modulation states on the sending side and four phase modulation bases on the receiving side, according to an embodiment of the present invention.

FIG. 20 represents, in a complex plane, fluctuations of coherent states (of laser light) transmitted from the sending side. Eight circles 601 to 608 shown in FIG. 20 correspond to angles of phase modulation performed by the phase modulator 103 of the quantum cryptography communication apparatus 100 serving as the data transmitting apparatus. More specifically, these eight circles respectively indicate quantum states (coherent states) of 22.5° modulation data 601, 67.5° modulation data 602, 112.5° modulation data 603, 157.5° modulation data 604, 202.5° modulation data 605, 247.5° modulation data 606, 292.5° modulation data 607, and 337.5° modulation data 628. The distance from the origin to the center of each circle is proportional to the square root of the average number of photons in the coherent state corresponding to the circle. The radius of each circle indicates the fluctuation of the corresponding quantum state.

On the other hand, on the receiving side, the phase modulation by the phase modulator 202 of the quantum cryptography communication apparatus 200 is performed by an angle of one of 0°, 45°, 90°, and 135°. These four phases respectively correspond to a basis (used in the phase modulation performed on the receiving side) 621 represented by an axis X1 ($\Phi B=0°$), a basis (used in the phase modulation performed on the receiving side) 622 represented by an axis X1/2 ($\Phi B=45°$), a basis (used in the phase modulation performed on the receiving side) 623 represented by an axis X2 ($\Phi B=90°$), and a basis (used in the phase modulation performed on the receiving side) 624 represented by an axis X3/2 ($\Phi B=135°$). In the present mode, the distance from the origin to the center of each circle is set to be equal to each other, and thus the number of photons is equal in any coherent state. Therefore, the attenuator is not needed in the present mode.

In the present embodiment, on the sending side, a coherent state is randomly selected from the eight coherent states respectively corresponding to angles of phase modulation 22.5°, 67.5°, 112.5°, 157.5°, 202.5°, 247.5°, 292.5°, and 337.5° performed by the phase modulator 103, and light modulated into the selected coherent state is transmitted. On the receiving side, a basis is randomly selected from the bases respectively corresponding to the angles of phase modulation 0°, 45°, 90°, and 135°, and phase modulation is performed using the selected basis by the phase modulator 202 (FIG. 8). Furthermore, homodyne detection is performed using the photodiodes 204 and 205, the amplifier 207, and the voltage measurement unit 208.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the respective quantum states (coherent states) corresponding to 22.5°, 67.5°, 112.5°, 157.5°, 202.5°, 247.5°, 292.5°, and 337.5° applied on the data receiving side, and information indicating the assigned bit values is transmitted to the receiving side.

If the measurement is performed using the basis (phase modulation on the receiving side) 621 corresponding to the 0° phase modulation axis ($\Phi B=0°$) shown in FIG. 20, then, on the sending side, the bit 1 is assigned to the respective four coherent states of the 22.5° modulation data 601, the 67.5° modulation data 602, the 292.5° modulation data 607, and the 337.5° modulation data 608, and the bit 0 is assigned to the respective four coherent states of the 112.5° modulation data 603, the 157.5° modulation data 604, the 202.5° modulation data 605, and the 247.5° modulation data 606.

If the measurement is performed using the basis (phase modulation on the receiving side) 622 corresponding to the 45° phase modulation axis ($\Phi B=45°$) shown in FIG. 20, then, on the sending side, the bit 1 is assigned to the respective four coherent states of the 22.5° modulation data 601, the 67.5° modulation data 602, the 112.5° modulation data 603, the 337.5° modulation data 608, and the bit 0 is assigned to the respective four coherent states of the 157.5° modulation data 604, the 202.5° modulation data 605, the 247.5° modulation data 606, and the 292.5° modulation data 607.

If the measurement is performed using the basis (phase modulation on the receiving side) 623 corresponding to the 90° phase modulation axis ($\Phi B=90°$) shown in FIG. 20, then, on the sending side, the bit 1 is assigned to the respective four coherent states of the 22.5° modulation data 601, the 67.5° modulation data 602, the 112.5° modulation data 603, and the 157.5° modulation data 604, and the bit 0 is assigned to the respective four coherent states of the 202.5° modulation data 605, the 247.5° modulation data 606, the 292.5° modulation data 607, and the 337.5° modulation data 608.

If the measurement is performed using the basis (phase modulation on the receiving side) 624 corresponding to the 135° phase modulation axis ($\Phi B=135°$) shown in FIG. 20, then, on the sending side, the bit 1 is assigned to the respective four coherent states of the 67.5° modulation data 602, the 112.5° modulation data 603, the 157.5° modulation data 604, and the 202.5° modulation data 605, and the bit 0 is assigned to the respective four coherent states of the 22.5° modulation data 601, the 247.5° modulation data 606, the 292.5° modulation data 607, and the 337.5° modulation data 608.

After data is transmitted from the data transmitting apparatus, the data transmitting apparatus receives the measurement mode information from the data receiving apparatus and performs the bit assigning process as described above depending on the phase modulation performed on the receiving side. Note that the bits 0 and 1 do not necessarily need to be assigned in the above-described manner, but the bits 0 and 1 may be replaced with each other.

As described above, by performing encoding such that, depending on the mode in which the measurement is performed on the receiving side, bit values are assigned to all respective eight quantum states transmitted from the sending side, it is possible to use all these eight quantum states to transmit information to be shared. In this encoding scheme, the probability that transmission does not make a contribution to sharing of information such as a common secret key because of mismatching of the basis between the sending side and the receiving side can be reduced to 0.

Referring to FIG. 21, the coding efficiency in the present embodiment is described. In a table shown in FIG. 21, angles of phase modulation (ΦA) performed on the data sending side are shown in a row (A), angles of phase modulation (ΦB) performed on the data receiving side are shown in a row (B), shared bits are shown in a row (C), and the sharable bit ratio is shown in a row (D).

More specifically, the row (A) shows angles of phase modulation (ΦA) employed in the phase modulation process (shown in FIG. 20) performed on the data sending side to obtain eight respective modulation signals, that is, 22.5° modulation data 601, 67.5° modulation data 602, 112.5° modulation data 603, 157.5° modulation data 604, 202.5° modulation data 605, 247.5° modulation data 606, 292.5° modulation data 607, and 337.5° modulation data 608.

The row (B) shows the angles of phase modulation (ΦB) performed on the data receiving side, which correspond to four bases employed as observation systems (shown in FIG. 20) on the receiving side. As shown, the angle of phase modulation performed on the data receiving side is equal to 0°, 45°, 90°, or −135°.

When the eight phase modulation signals (ΦB=22.5°, 67.5°, 112.5°, 157.5°, 202.5°, 247.5°, 292.5°, 337.5°) are arbitrarily and randomly selected on the sending side, and four angles of phase modulation (ΦA=0°, 45°, 90°, 135°) are randomly selected on the receiving side, thirty-two combinations shown in FIG. 21 equally occur.

The row (C) of the table shown in FIG. 21 indicates bit information shared by both sender and receiver. As described earlier, the assignment of the bit values is changed depending on the observation system employed on the receiving side so that bit value sharing is possible in any of the thirty-two combinations. That is, bit value sharing is possible in any of thirty-two combinations in terms of the angle of phase modulation (performed on the sending side) selected from the eight values and the angle of phase modulation (performed on the receiving side) selected from the four values, and thus the sharable information ratio is 100% as indicated in the row (D). In other words, there is no transmitted data that does not contribute to sharing of the secret information. Furthermore, the large number of states and the large number of required measurements make it difficult to eavesdrop on the information. The reduction in the possibility of being eavesdropped results in an increase in security.

Quantum Cryptography Communication Process in a General Mode with N Phase Modulation States Examples of quantum cryptography communication processes have been described above for the following modes.

(1) Mode with four phase modulation states on the sending side and two phase modulation bases on the receiving side.

(2) Mode with three phase modulation states on the sending side and three phase modulation bases on the receiving side.

(3) Mode with six phase modulation states on the sending side and three phase modulation bases on the receiving side.

(4) Mode with eight phase modulation states on the sending side and two phase modulation bases on the receiving side.

(5) Mode with eight phase modulation states on the sending side and four phase modulation bases on the receiving side.

However, the present invention is not limited to these modes, but various other modes are possible. Some examples of other possible modes are described below.

Mode with 4N Phase Modulation States on the Sending Side and Two Phase Modulation Bases on the Receiving Side.

In the quantum cryptography communication system described earlier with reference to FIG. 8, a quantum cryptography communication process may be performed in a mode with 4N phase modulation states on the sending side and two phase modulation bases on the receiving side according to an embodiment of the present invention, where N is a positive integer (N=1, 2, . . . ). In this mode, phase modulation by the phase modulator 103 of the quantum cryptography communication apparatus 100 serving as the data transmitting apparatus and phase modulation by the phase modulator 202 of the quantum cryptography communication apparatus 200 serving as the data receiving apparatus are performed as described below.

The phase modulator 103 of the quantum cryptography communication apparatus 100 serving as the data transmitting apparatus performs phase modulation by an angle equal to $(\pi/2N)j+(\pi/4N)$, where j is randomly selected from 0, 1, . . . , 4N−1.

On the other hand, the phase modulator 202 of the quantum cryptography communication apparatus 200 serving as the data receiving apparatus performs homodyne detection by performing phase modulation by an angle equal to 0° or 90°.

When N=1, the present mode equivalent to the above-described mode with four phase modulation states on the sending side and two phase modulation bases on the receiving side. In this case, as described earlier with reference to FIG. 11, the sharable information ratio, that is, the ratio of bit information that can be shared by both the sending side and the receiving side from transmission data can be 100%. That is, information can be transmitted efficiently without transmitting any useless data.

Mode with 4N Phase Modulation States on the Sending Side and 2N Phase Modulation Bases on the Receiving Side.

In the quantum cryptography communication system described earlier with reference to FIG. 8, a quantum cryptography communication process may be performed in a mode with 4N phase modulation states on the sending side and 2N phase modulation bases on the receiving side according to an embodiment of the present invention, where N is a positive integer (N=1, 2, . . . ). In this mode, phase modulation by the phase modulator 103 of the quantum cryptography communication apparatus 100 serving as the data transmitting apparatus and phase modulation by the phase modulator 202 of the quantum cryptography communication apparatus 200 serving as the data receiving apparatus are performed as described below.

The phase modulator 103 of the quantum cryptography communication apparatus 100 serving as the data transmitting apparatus performs phase modulation by an angle equal to $(\pi/2N)j+(\pi/4N)$, where j is randomly selected from $0, 1, \ldots, 4N-1$.

On the other hand, the phase modulator 202 of the quantum cryptography communication apparatus 200 serving as the data receiving apparatus performs phase modulation by an angle equal to $(\pi/2N)k$, where k is randomly selected from $0, 1, \ldots, 2N-1$.

When N=1, the present mode equivalent to the above-described mode with four phase modulation states on the sending side and two phase modulation bases on the receiving side. In this case, as described earlier with reference to FIG. 11, the sharable information ratio, that is, the ratio of bit information that can be shared by both the sending side and the receiving side from transmission data can be 100%. That is, information can be transmitted efficiently without transmitting any useless data.

When N=2, the present mode equivalent to the above-described mode with eight phase modulation states on the sending side and four phase modulation bases on the receiving side. In this case, as described earlier with reference to FIG. 21, the sharable information ratio, that is, the ratio of bit information that can be shared by both the sending side and the receiving side from transmission data can be 100%. Furthermore, the large number of coherent states and the large number of required measurements make it difficult to eavesdrop on the information. The reduction in the possibility of being eavesdropped results in an increase in security.

The two modes described above cannot be equivalent to all modes described earlier. The mode according to the present invention can be further generalized as follows.

On the data sending side, a set of quantum states (coherent states) used to transmit data is defined.

More specifically, a set of quantum states (coherent states) used to transmit data is defined as follows.

a) An integer M≧2 is selected.

b) An angle of phase modulation is randomly selected to be equal to an integral multiple of $2\pi/M$.

c) In accordance with the angle of phase modulation selected above, a phase modulation process is performed by the phase modulator 103 of the quantum cryptography communication apparatus 100 serving as the data transmitting apparatus described earlier with reference to FIG. 8, and the resultant light signal is transmitted.

In the case in which it is needed to adjust the number of photons to achieve particular quantum states (coherent states) as described earlier with reference to FIG. 17 and FIGS. 18A to 18C, the number of photons is adjusted (the intensity is modulated) using an attenuator.

On the data receiving side, the finite number of coherent states of data transmitted from the data sending side are observed. More specifically, the process is performed as follows.

a) Two or more bases used as an observation system (in the phase modulation process) is defined.

b) Homodyne detection is performed using an observation system randomly selected from the two or more observation bases defined above.

The observation process described above is performed as the homodyne detection process using the randomly selected bases (corresponding to the respective angles of phase modulation) by the phase modulator 202 of the quantum cryptography communication apparatus 200 serving as the data receiving apparatus described above with reference to FIG. 8.

The data receiving apparatus transmits, to the data transmitting apparatus, measurement mode information indicating the observation systems, that is, the bases used in the phase modulation process on the receiving side. On the sending side, depending on the phase modulation performed on the receiving side, bit values are assigned to the transmitted respective quantum states (coherent states) corresponding to integral multiples of $2\pi/M$ where M is an integer ($\geqq 2$) defined on the sending side. Thereafter, information indicating the assigned bit values is transmitted to the receiving side. However, no bit value is assigned to a quantum state determined to be difficult to measure using the selected bases (in a phase modulation process) in the data receiving apparatus.

Information can be shared as described below depending on the mode.

In the mode with four phase modulation states on the sending side and two phase modulation bases on the receiving side, bit information is assigned to all four phase modulation states on the sending side, and all four phase modulation states can carry effective bit information. That is, 100% of transmitted data can contribute to sharing of data by the sending side and the receiving side (FIG. 11).

In the mode with three phase modulation states on the sending side and three phase modulation bases on the receiving side, bit information is assigned to ⅔ of a total of three phase modulation states on the sending side, and ⅔ of the total of three phase modulation states generated on the sending side can carry effective bit information. That is, ⅔ of transmitted data can contribute to sharing of data by the sending side and the receiving side (FIG. 14).

In the mode with six phase modulation states on the sending side and three phase modulation bases on the receiving side, bit information is assigned to ⅔ of a total of six phase modulation states on the sending side, and ⅔ of the total of six phase modulation states generated on the sending side can carry effective bit information. That is, ⅔ of transmitted data can contribute to sharing of data by the sending side and the receiving side (FIGS. 16A and 16B).

In the mode with eight phase modulation states on the sending side and two phase modulation bases on the receiving side, bit information is assigned to ¾ of a total of eight phase modulation states on the sending side, and ¾ of the total of six phase modulation states generated on the sending side can carry effective bit information. That is, ¾ of transmitted data can contribute to sharing of data by the sending side and the receiving side (FIG. 19).

In the mode with eight phase modulation states on the sending side and four phase modulation bases on the receiving side, bit information is assigned to all of a total of eight phase modulation states on the sending side, and all phase modulation states can carry effective bit information. That is, all transmitted data can contribute to sharing of data by the sending side and the receiving side (FIG. 21). In this mode, the information sharing ratio is 100%. Furthermore, the large number of states and the large number of required measurements make it difficult to eavesdrop on the information. The reduction in the possibility of being eavesdropped results in an increase in security.

As described above, depending on the mode in which the measurement is performed in the data receiving apparatus, bit values are assigned to respective quantum states corresponding to integral multiples of $2\pi/M$ transmitted from the data transmitting apparatus, and the assigned bit values are shared by the data transmitting apparatus and the data receiving apparatus. For example, if bit values of a secret key are assigned, then the secret key can be shared by the data transmitting apparatus and the data receiving apparatus. The effective assignment of bit information to a large number of quantum states results in an increase in data transmission efficiency. Furthermore, the large number of states and thus the corresponding large number of phase modulation modes make it difficult to eavesdrop on the information. The reduction in the possibility of being eavesdropped results in an increase in security.

The present invention has been described above with reference to specific embodiments by way of example and not limitation. It should be understood by those skilled in the art that various modifications, combinations, sub-combinations and alterations may occur depending on design requirements and other factors insofar as they are within the scope of the appended claims or the equivalents thereof.

The invention claimed is:

1. A method of performing quantum cryptography communication by performing a communication process based on quantum cryptography, the method comprising:
   transmitting data from a data transmitting apparatus, the data including a sequence of signals in the form of quantum states randomly selected from a plurality of quantum states each having a different phase modulation angle;
   detecting the sequence of signals in a data receiving apparatus, the detection step including receiving the sequence of signals, randomly selecting from a plurality of bases corresponding to a plurality of different phase modulation angles, and performing a homodyne detection process using the selected bases;
   notifying the data transmitting apparatus of applied phase modulation mode information indicating the bases used in the detection step; and
   sharing information in the data transmitting apparatus, the information sharing step including (i) assigning, by the data transmitting apparatus, bit values to the plurality of different quantum states selected by the data transmitting apparatus in accordance with the applied phase modulation mode information notified by the data receiving apparatus, wherein the assigning bit values includes determining, for each of the signals received in the data receiving apparatus, a difference between the phase modulation angle corresponding to the quantum state of the received signal and the phase modulation angle corresponding to the selected base used in performing the homodyne detection process on the received signal and using an absolute value of the difference, in accordance with the plurality of quantum states randomly selected from and the plurality of bases randomly selected from, to assign the bit values; and (ii) notifying the data receiving apparatus, by the data transmitting apparatus, of the assigned bit values.

2. The method of quantum cryptography communication according to claim 1, wherein the data transmission step includes:
   setting an infinite number of quantum states (coherent states), the quantum state setting step including
   selecting an integer M equal to or greater than 2;
   randomly selecting a phase modulation angle from integral multiples of $2\pi/M$; and
   performing a phase modulation process according to the selected phase modulation angle and transmitting the resultant phase-modulated signal.

3. The method of quantum cryptography communication according to claim 1, wherein the information sharing step includes assigning bit values to an infinite number of different quantum states selected by the data transmitting apparatus in accordance with the applied phase modulation mode information notified by the data receiving apparatus such that no bit value is assigned to a quantum state determined to be difficult to measure using the selected bases (in a phase modulation process) in the data receiving apparatus.

4. The method of quantum cryptography communication according to claim 1, wherein the data transmission step further includes:
   performing a number-of-photons adjustment process (intensity modulation) if the plurality of different quantum states include a quantum state in which the average number of photons is different from that in another quantum state.

5. The method of quantum cryptography communication according to claim 1, wherein the detection step includes:
   discriminating a signal by comparing information detected in the homodyne detection process with a threshold value.

6. The method of quantum cryptography communication according to claim 1, wherein
   the data transmission step includes transmitting a signal sequence generated by randomly selecting quantum states each phase-modulated by a value equal to one of 45°, 135°, 225°, and 315°,
   the detection step includes receiving the signal sequence, randomly selecting a plurality of bases each corresponding to 0° or 90° as the plurality of different phase modulation angles, and performing the homodyne detection process using the selected bases, and
   the information sharing step includes assigning bit values to all of eight combinations of one of two applied phase modulation modes notified by the data receiving apparatus and one of four phase modulation angles 45°, 135°, 225°, and 315° set by the data transmitting apparatus, and notifying the data transmitting apparatus of the assigned bit values.

7. The method of quantum cryptography communication according to claim 1, wherein
   the data transmission step includes transmitting a signal sequence generated by randomly selecting quantum states each phase-modulated by a value equal to one of 0°, 120°, and 240°,
   the detection step includes receiving the signal sequence, randomly selecting a plurality of bases each corresponding to 90°, −30°, or −150° as the plurality of different phase modulation angles, and performing the homodyne detection process using the selected bases, and
   the information sharing step includes assigning bit values to six combinations of a total of nine combinations of one of three applied phase modulation modes notified by the data receiving apparatus and one of three phase modulation angles 0°, 120°, and 240° set by the data transmitting apparatus, and notifying the data transmitting apparatus of the assigned bit values.

8. The method of quantum cryptography communication according to claim 1, wherein
   the data transmission step includes transmitting a signal sequence generated by randomly selecting quantum states each phase-modulated by a value equal to one of 0°, 60°, 120°, 180°, 240°, and 300°,
   the detection step includes receiving the signal sequence, randomly selecting a plurality of bases each corresponding to 90°, −30°, or −150° as the plurality of different phase modulation angles, and performing the homodyne detection process using the selected bases, and the information sharing step includes assigning bit values to twelve combinations of a total of eighteen combinations of one of three applied phase modulation modes notified by the data receiving apparatus and one of six phase modulation angles 0°, 60°, 120°, 180°, 240°, and 300° set by the data transmitting apparatus, and notifying the data transmitting apparatus of the assigned bit values.

9. The method of quantum cryptography communication according to claim 1, wherein
the data transmission step includes transmitting a signal sequence generated by randomly selecting quantum states each phase-modulated by a value equal to one of 0°, 45°, 90°, 135°, 180°, 225°, 270°, and 315°,
the detection step includes receiving the signal sequence, randomly selecting a plurality of bases each corresponding to 0° or 90° as the plurality of different phase modulation angles, and performing the homodyne detection process using the selected bases, and
the information sharing step includes assigning bit values to twelve combinations of a total of sixteen combinations of one of two applied phase modulation modes notified by the data receiving apparatus and one of eight phase modulation angles 0°, 45°, 90°, 135°, 180°, 225°, 270°, and 315° set by the data transmitting apparatus, and notifying the data transmitting apparatus of the assigned bit values.

10. The method of quantum cryptography communication according to claim 9, wherein the data transmission step further includes performing a number-of-photons adjustment process (intensity modulation) in the setting of eight quantum states respectively phase-modulated by 0°, 45°, 90°, 135°, 180°, 225°, 270°, and 315°.

11. The method of quantum cryptography communication according to claim 1, wherein
the data transmission step includes transmitting a signal sequence generated by randomly selecting quantum states each phase-modulated by a value equal to one of 22.5°, 67.5°, 112.5°, 157.5°, 202.5°, 247.5°, 292.5°, and 337.5°,
the detection step includes receiving the signal sequence, randomly selecting a plurality of bases each corresponding to 0°, 45°, 90°, or 135° as the plurality of different phase modulation angles, and performing the homodyne detection process using the selected bases, and
the information sharing step includes assigning bit values to all thirty-two combinations of one of four applied phase modulation modes notified by the data receiving apparatus and one of eight phase modulation angles 22.5°, 67.5°, 112.5°, 157.5°, 202.5°, 247.5°, 292.5°, 337.5° set by the data transmitting apparatus, and notifying the data transmitting apparatus of the assigned bit values.

12. A quantum cryptography communication apparatus adapted to receive quantum-encrypted data from a data transmitting apparatus and perform a detection process, comprising:
a homodyne detection unit adapted to perform a homodyne detection process on the quantum-encrypted data, wherein the quantum-encrypted data includes at least one received signal having a quantum state randomly selected from a plurality of quantum states each having a different phase modulation angle, the homodyne detection unit including a phase modulator adapted to perform phase modulation on the received signal using a basis of phase modulation randomly selected from a set of a plurality of different bases, whereby the homodyne detection unit distinguishes the quantum state of the received signal from at least one of the other randomly selectable quantum states in the homodyne detection process based on the phase modulation using the selected basis and bit values assigned to the plurality of quantum states and notified to the quantum cryptography communication apparatus by the data transmitting apparatus, wherein the bit values are assigned by determining a difference between the phase modulation angle corresponding to the quantum state of the received signal and the phase modulation angle corresponding to the selected basis and using an absolute value of the difference, in accordance with the plurality of quantum states randomly selected from and the plurality of bases randomly selected from, to assign the bit values.

13. The quantum cryptography communication apparatus according to claim 12, wherein the phase modulator performs the phase modulation using a basis of phase modulation randomly selected from a set of different bases corresponding respectively to 0° and 90°.

14. The quantum cryptography communication apparatus according to claim 12, wherein the phase modulator performs the phase modulation using a basis of phase modulation randomly selected from a set of different bases corresponding respectively to 90°, −30°, and −150°.

15. The quantum cryptography communication apparatus according to claim 12, wherein the phase modulator performs the phase modulation using a basis of phase modulation randomly selected from a set of different bases corresponding respectively to 0°, 45°, 90°, and 135°.

16. A quantum cryptography communication system adapted to perform a communication process based on quantum cryptography, comprising:
a data transmitting apparatus adapted to perform a data transmission process based on quantum cryptography; and
a data receiving apparatus adapted to perform a receiving process on quantum-encrypted data,
the data transmitting apparatus including
a light source,
a phase modulator,
a beam splitter adapted to split light output from the light source to generate (i) a reference light beam and (ii) an input light beam incident on the phase modulator,
the phase modulator adapted to perform phase modulation on the input light beam incident on the phase modulator generated by the beam splitter to thereby generate phase-modulated light, and
an attenuator adapted to attenuate the phase-modulated light from the phase modulator to thereby generate signal light transmitted with the reference light beam in accordance with the data transmission process,
wherein the phase modulator performs the phase modulation by a phase modulation angle equal to a value randomly selected from integral multiples of $2\pi/M$, where M is an integer equal to or greater than 2,
wherein the attenuator attenuates the phase-modulated light by a predetermined factor depending on a phase modulation angle by which the phase modulator performs the phase modulation; and
the data receiving apparatus including
a homodyne detection unit adapted to perform a homodyne detection process on the quantum-encrypted data, the homodyne detection unit including a phase modulator adapted to perform phase modulation on a received signal using a basis of phase modulation randomly selected from a set of a plurality of different bases, whereby the homodyne detection unit distinguishes at least two quantum states from each other in the homodyne detection process based on the phase modulation using the selected basis and bit values assigned to the plurality of quantum states, wherein the assigned bit values are determined based on a difference between the phase modulation angle corresponding to the quantum state of the received signal and the phase modulation angle corresponding to the selected basis.

17. A method of detecting quantum-encrypted data by receiving quantum-encrypted data from a data transmitting apparatus and performing a detection process, the method comprising:

performing a homodyne detection process on the quantum-encrypted data, wherein the quantum-encrypted data includes at least one received signal having a quantum state randomly selected from a plurality of quantum states each having a different phase modulation angle, the homodyne detection process including performing phase modulation on the received signal using a basis of phase modulation randomly selected from a set of a plurality of different bases, whereby the quantum state of the received signal is distinguished from at least one of the other randomly selectable quantum states based on the phase modulation using the selected basis and bit values assigned to the plurality of quantum states and notified to the quantum cryptography communication apparatus by the data transmitting apparatus, wherein the bit values are assigned by determining a difference between the phase modulation angle corresponding to the quantum state of the received signal and the phase modulation angle corresponding to the selected basis and using an absolute value of the difference, in accordance with the plurality of quantum states randomly selected from and the plurality of bases randomly selected from, to assign the bit values.

18. The method of detecting quantum-encrypted data according to claim 17, wherein the phase modulation step includes performing the phase modulation using a basis of phase modulation randomly selected from a set of different bases corresponding respectively to 0° and 90°.

19. The method of detecting quantum-encrypted data according to claim 17, wherein the phase modulation step includes performing the phase modulation using a basis of phase modulation randomly selected from a set of different bases corresponding respectively to 90°, −30°, and −150°.

20. The method of detecting quantum-encrypted data according to claim 17, wherein the phase modulation step includes performing the phase modulation using a basis of phase modulation randomly selected from a set of different bases corresponding respectively to 0°, 45°, 90°, and 135°.

* * * * *